United States Patent
Nishimura et al.

(10) Patent No.: US 8,941,718 B2
(45) Date of Patent: Jan. 27, 2015

(54) 3D VIDEO PROCESSING APPARATUS AND 3D VIDEO PROCESSING METHOD

(75) Inventors: Kengo Nishimura, Osaka (JP); Yohei Ikeuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 847 days.

(21) Appl. No.: 13/192,946

(22) Filed: Jul. 28, 2011

(65) Prior Publication Data
US 2011/0279647 A1 Nov. 17, 2011

Related U.S. Application Data

(63) Continuation of application No. PCT/JP2010/004998, filed on Aug. 9, 2010.

(30) Foreign Application Priority Data

Oct. 2, 2009 (JP) ................................. 2009-231003

(51) Int. Cl.
*H04N 13/00* (2006.01)
*H04N 19/70* (2014.01)

(52) U.S. Cl.
CPC ..... *H04N 13/0022* (2013.01); *H04N 19/00884* (2013.01)
USPC ..................................... 348/43; 348/E13.073

(58) Field of Classification Search
None
See application file for complete search history.

(56) References Cited

U.S. PATENT DOCUMENTS

| 5,751,927 | A | * | 5/1998 | Wason | 345/419 |
|---|---|---|---|---|---|
| 6,111,596 | A | * | 8/2000 | Haskell et al. | 348/42 |
| 6,924,799 | B2 | * | 8/2005 | Lefebvre et al. | 345/419 |
| 8,369,607 | B2 | * | 2/2013 | Mashitani et al. | 382/154 |
| 2004/0032980 | A1 | * | 2/2004 | Harman | 382/154 |
| 2005/0089212 | A1 | | 4/2005 | Mashitani et al. | |
| 2006/0143020 | A1 | * | 6/2006 | Zaima | 705/1 |
| 2006/0203085 | A1 | * | 9/2006 | Tomita | 348/51 |
| 2008/0134096 | A1 | * | 6/2008 | Satoshi | 715/838 |
| 2008/0297436 | A1 | | 12/2008 | Oikawa et al. | |

(Continued)

FOREIGN PATENT DOCUMENTS

JP 2003-284093 A 10/2003
JP 2004-104742 4/2004

(Continued)

OTHER PUBLICATIONS

Newton, "2D + offset system for 3D compatible playback on BD-systems," IP.com No. IPCOM000186501D, Aug. 24, 2009, pp. 1-6.*

(Continued)

*Primary Examiner* — Jay Au Patel
*Assistant Examiner* — Reza Aghevli
(74) *Attorney, Agent, or Firm* — McDermott Will & Emery LLP

(57) ABSTRACT

A 3D video processing apparatus according to an aspect of the present invention includes an offset value complementing unit which complements an offset value of the first picture, by assigning a value which is equal to or greater than the first offset value and equal to or smaller than the second offset value, the first offset value representing the smaller one of the offset value assigned to the second picture temporally preceding the first picture and the offset value assigned to the third picture temporally succeeding the first picture, and the second offset value representing the larger one of the offset value assigned to the second picture and the offset value assigned to the third picture.

7 Claims, 32 Drawing Sheets

(56) References Cited

U.S. PATENT DOCUMENTS

| | | |
|---|---|---|
| 2009/0073170 A1* | 3/2009 | Berretty et al. ............... 345/427 |
| 2009/0109281 A1* | 4/2009 | Mashitani et al. ............. 348/43 |
| 2009/0142041 A1* | 6/2009 | Nagasawa et al. ............ 386/124 |
| 2009/0160934 A1* | 6/2009 | Hendrickson et al. .......... 348/47 |
| 2010/0118119 A1 | 5/2010 | Newton et al. |

FOREIGN PATENT DOCUMENTS

| | | | |
|---|---|---|---|
| JP | 2005-267655 | 9/2005 | |
| JP | 2007-309084 | * 11/2007 | ............... H04N 5/92 |
| JP | 2008-300983 A | 12/2008 | |
| JP | 2009-135686 | 6/2009 | |
| WO | 2008/044191 | 4/2008 | |

OTHER PUBLICATIONS

International Search Report in PCT/JP2010/004998, dated Nov. 9, 2010.

* cited by examiner

| | Item | Value | Number of bits |
|---|---|---|---|
| 141 | Frame rate | 24 fps | 4 |
| 142 | Initial PTS | 100 | 33 |
| 143 | Number of offset values | 15 | 7 |
| 144 | Number of frames | 15 | 8 |
| 145 ID0 | Offset direction | + | 1 |
| | Absolute value of offset value | 6 | 6 |
| 146 ID1 | Offset direction | + | 1 |
| 147 | Absolute value of offset value | 10 | 6 |
| ID2 | Offset direction | + | 1 |
| | Absolute value of offset value | 40 | 6 |
| ⋮ | | | |
| ID14 | Offset direction | - | 1 |
| | Absolute value of offset value | 10 | 6 |

3D VIDEO PROCESSING APPARATUS AND 3D VIDEO PROCESSING METHOD

CROSS REFERENCE TO RELATED APPLICATION

This is a continuation application of PCT application No. PCT/JP2010/004998 filed on Aug. 9, 2010, designating the United States of America.

BACKGROUND OF THE INVENTION (1) Field of the Invention

The present invention relates to three-dimensional (3D) video processing apparatuses and 3D video processing methods and particularly to a 3D video processing apparatus which processes video signals including video data indicating 3D video images and control information on such video data.

(2) Description of the Related Art

There is a known 3D video display apparatus which displays 3D video images that are two-dimensional (2D) video images which convey a stereoscopic perception to a viewer (for example, see Patent Literature 1: Japanese Unexamined Patent Application Publication No. 2005-267655).

This 3D video display apparatus displays the images which convey a stereoscopic perception to a viewer, by displaying a right-eye image and a left-eye image which have a parallax therebetween. For example, the 3D display apparatus displays the right-eye image and the left-eye image alternately for each frame. In addition, the viewer uses a pair of glasses which switch, for each frame, sights between the right eye and the left eye. This allows the viewer to view the right-eye image with the right eye only and the left-eye image with the left eye only and to thereby recognize, in three dimensions, the images which the 3D video display apparatus displays.

SUMMARY OF THE INVENTION

However, such a 3D video processing apparatus which processes 3D video images as above is demanded to produce better 3D video images for users.

Thus, an object of the present invention is to provide a 3D video processing apparatus and a 3D video processing method, by which better 3D video images for users can be provided.

In order to achieve the above object, a 3D video processing apparatus according to an aspect of the present invention is a 3D video processing apparatus that processes a video signal which includes video data indicating a 3D video and control information on the video data, the 3D video processing apparatus including: an extracting unit configured to extract, from the control information, an offset value that is assigned to each of pictures included in the video data and indicates an amount by which at least part of the picture is shifted to adjust a depth-wise display position of the part; an offset value complementing unit configured to complement the offset value of a first picture using the offset value extracted by the extracting unit, by assigning, to the first picture, the offset value which is equal to or greater than a first offset value and equal to or smaller than a second offset value, the first offset value representing a smaller one of the offset value assigned to a second picture temporally preceding the first picture and the offset value assigned to a third picture temporally succeeding the first picture, and the second offset value representing a larger one of the offset value assigned to the second picture and the offset value assigned to the third picture; and an offset control unit configured to adjust the depth-wise display position of at least part of the first picture by shifting the part by an amount corresponding to the offset value complemented by the offset value complementing unit.

With the above structure, the present invention can provide a 3D video processing apparatus and a 3D video processing method, by which better 3D video images for users can be provided.

FURTHER INFORMATION ABOUT TECHNICAL BACKGROUND TO THIS APPLICATION

The disclosure of Japanese Patent Application No. 2009-231003 filed on Oct. 2, 2009 including specification, drawings and claims is incorporated herein by reference in its entirety.

The disclosure of PCT application No. PCT/JP2010/004998 filed on Aug. 9, 2010, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7 shows a structure of offset information according to the first embodiment of the present invention;

DESCRIPTION OF THE PREFERRED EMBODIMENT(S)

Embodiments of the 3D video processing apparatus according to the present invention are described in detail below with reference to the drawings.

First Embodiment

A 3D video processing apparatus according to the first embodiment of the present invention generates converted video signals by inserting a new picture between pictures of input video signals. Furthermore, the 3D video processing apparatus according to the first embodiment of the present invention calculates a shift amount of the newly inserted picture using shift amounts of the pictures which precede and succeed the newly inserted picture. By so doing, the 3D video processing apparatus according to the first embodiment of the present invention is capable of generating favorable 3D video signals of which depth-wise display positions are converted smoothly.

First, a structure of a 3D video display system which includes the 3D video processing apparatus according to the first embodiment of the present invention is described.

Figure 1:
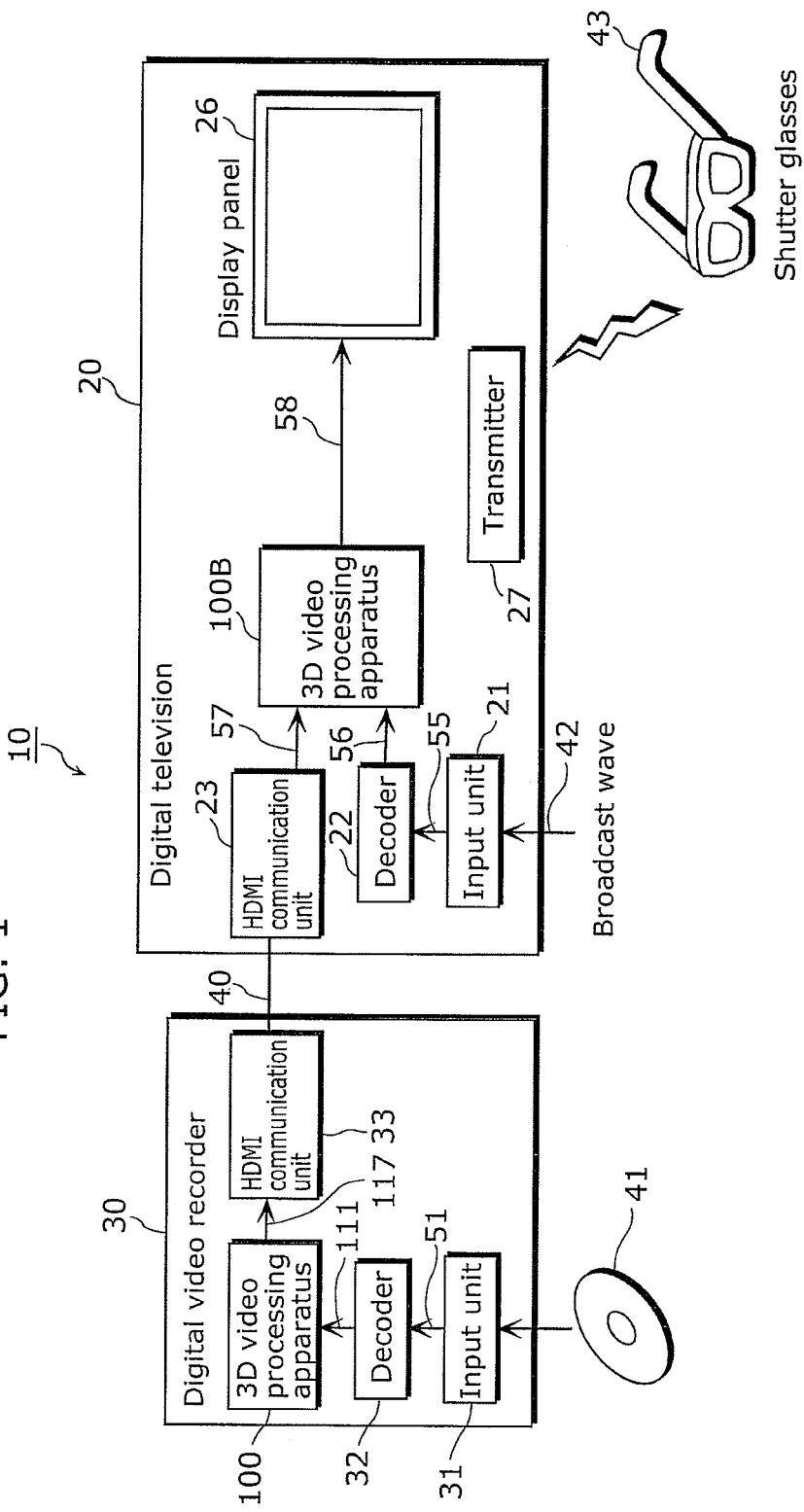
FIG. 1 is a block diagram showing a structure of a 3D video display system according to the first embodiment of the present invention.

FIG. 1 is a block diagram showing a structure of the 3D video display system according to the first embodiment of the present invention.

A 3D video display system 10 shown in FIG. 1 includes a digital television 20, a digital video recorder 30, and shutter glasses 43. The digital television 20 and the digital video recorder 30 are interconnected via a High-Definition Multimedia Interface (HDMI) cable 40.

The digital video recorder 30 processes 3D video signals recorded on an optical disc 41 such as a blu-ray disc (BD), and outputs the processed 3D video signals to the digital television 20 via the HDMI cable 40.

The digital television 20 displays 3D video images which are represented by 3D video signals output from digital video recorder 30 and by 3D video signals included in broadcast waves 42. For example, the broadcast waves 42 include digital terrestrial television broadcasting or digital satellite broadcasting.

The digital video recorder 30 may process 3D video signals recorded on a recording medium (e.g., a hard disk drive or a non-volatile memory) other than the optical disc 41. Furthermore, the digital video recorder 30 may process 3D video signals included in the broadcast waves 42 or 3D video signals obtained through communications network such as the Internet. In addition, the digital video recorder 30 may also process 3D video signals input from an external device to an external input terminal (not shown) or the like.

Likewise, the digital television 20 may display video images represented by 3D video signals recorded on the optical disc 41 and other recording media. Furthermore, the digital television 20 may display video images represented by 3D video signals obtained through communications network such as the Internet. In addition, the digital television 20 may display video images which are represented by 3D video signals input from an external device other than the digital video recorder 30 to an external input terminal (not shown) or the like.

Furthermore, the digital television 20 may perform predetermined processing on the obtained 3D video signals and display video images represented by the processed 3D video signals.

The digital television 20 and the digital video recorder 30 may also be interconnected via a standardized cable other than the HDMI cable 40 or via wireless communications network.

The digital video recorder 30 includes an input unit 31, a decoder 32, a 3D video processing apparatus 100, and an HDMI communication unit 33.

The input unit 31 receives coded 3D video signals 51 recorded on the optical disc 41.

The decoder 32 generates input video signals 111 by decoding the coded 3D video signals 51 received by the input unit 31.

The 3D video processing apparatus 100 generates output video signals 117 by processing the input video signals 111.

The HDMI communication unit 33 outputs the output video signals 117 generated by the 3D video processing apparatus 100, to the digital television 20 via the HDMI cable 40.

The digital video recorder 30 may store the generated output video signals 117 into a storage unit (such as a hard disk drive or a non-volatile memory) included in the digital video recorder 30, or may also store the generated output video signals 117 onto a recording medium (such as an optical disc) which can be inserted into and removed from the digital video recorder 30.

The digital television 20 includes an input unit 21, a decoder 22, an HDMI communication unit 23, a 3D video processing apparatus 100B, a display panel 26, and a transmitter 27.

The input unit 21 receives coded 3D video signals 55 included in the broadcast waves 42.

The decoder 22 generates input video signals 56 by decoding the coded 3D video signals 55 received by the input unit 21.

The HDMI communication unit 23 receives output video signals 117 provided by the HDMI communication unit 33, and outputs them as input video signals 57.

The 3D video processing apparatus 100B generates output video signals 58 by processing the input video signals 56 or the input video signals 57.

The display panel 26 displays video images which are represented by the output video signals 58 generated by the 3D video processing apparatus 100B.

The transmitter 27 controls the shutter glasses 43 using wireless communications.

Figure 2:
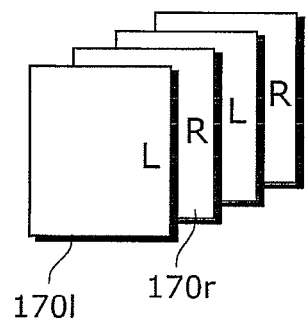
FIG. 2 shows an example of 3D video signals according to the first embodiment of the present invention.

FIG. 2 shows an example of 3D video data. As shown in FIG. 2, the 3D video data includes a left-eye image 170l and a right-eye image 170r which are alternately disposed.

Figure 3:
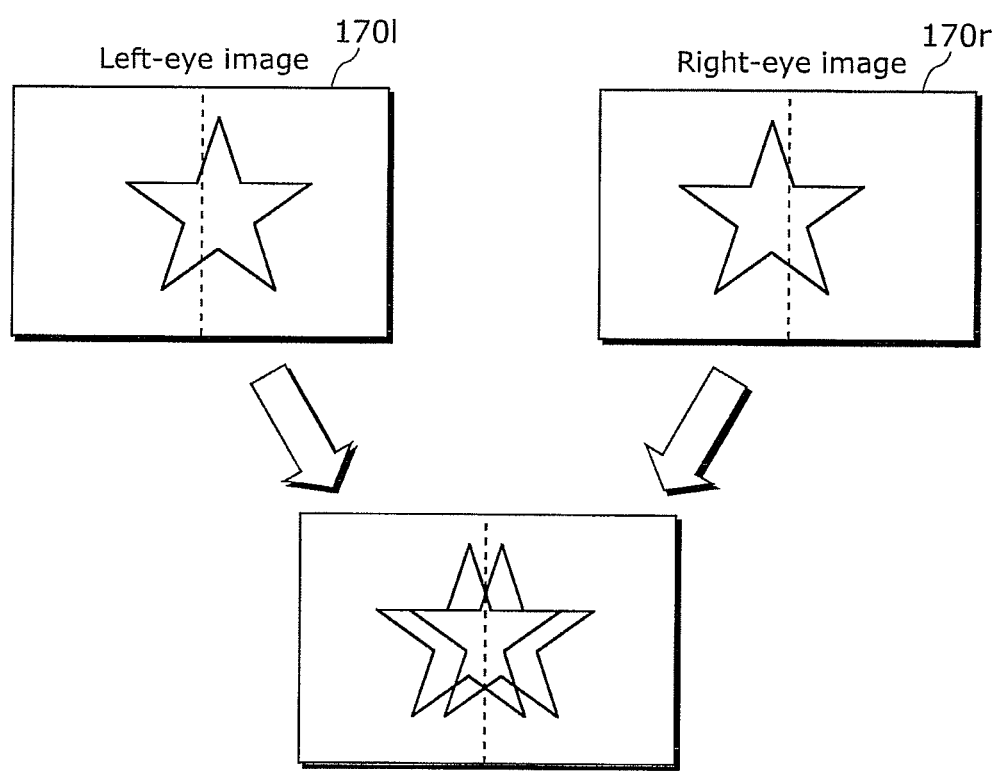
FIG. 3 shows an example of a left-eye image and a right-eye image according to the first embodiment of the present invention.

FIG. 3 shows an example of the left-eye image 170l and the right-eye image 170r.

As shown in FIG. 3, objects included in the left-eye image 170l and the right-eye image 170r have a parallax which depends on a distance from an image capturing position to the objects.

The shutter glasses 43 are, for example, liquid crystal shutter glasses worn by a viewer, and include a left-eye liquid crystal shutter and a right-eye liquid crystal shutter. The transmitter 27 controls opening and closing of the left-eye liquid crystal shutter and the right-eye liquid crystal shutter with the same timing of displaying the left-eye image 170l and the right-eye image 170r. Specifically, the transmitter 27 opens the left-eye liquid crystal shutter of the shutter glasses 43 and closes the right-eye liquid crystal shutter thereof while the left-eye image 170l is displayed. Furthermore, the transmitter 27 closes the left-eye liquid crystal shutter of the shutter glasses 43 and opens the right-eye liquid crystal shutter thereof while the right-eye image 170r is displayed. Thus, the left-eye image 170l and the right-eye image 170r selectively and respectively enter the left eye and the right eye of the viewer.

It is to be noted that the method of selectively presenting the left-eye image 170l and the right-eye image 170r respectively to the left eye and the right eye of the viewer is not limited to the method described above, and a method other than the above may be used.

Figure 4:
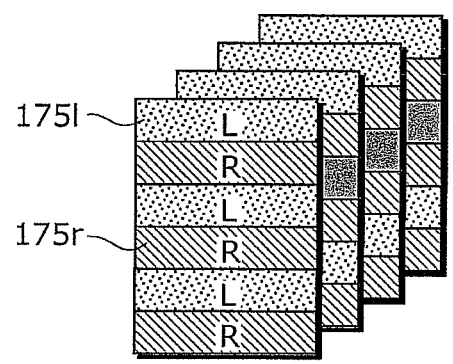
FIG. 4 shows another example of the 3D video signals according to the first embodiment of the present invention.

For example, as shown in FIG. 4, left-eye lines 175l and right-eye lines 175r are arranged in a stripe pattern within each picture of the 3D video data In this case, the display panel 26 includes a left-eye polarizing film formed on a left-eye pixel and a right-eye polarizing film formed on a right-eye pixel so that the left-eye lines 175l and the right-eye lines 175r are subject to different polarizations (linear polarization, circular polarization, or the like). The shutter glasses 43 can be replaced by polarized glasses having a left-eye polarizing filter and a right-eye polarizing filter which correspond to the above respective polarizations, so that the left-eye lines 175l and the right-eye lines 175r enter the left eye and the right eye, respectively, of the viewer.

The arrangement pattern of the left-eye video images and the right-eye video images in the 3D video data may be other than the horizontally striped pattern. For example, the left-eye video images and the right-eye video images may be arranged in a vertical stripe pattern within each picture. Alternatively, the left-eye video images and the right-eye video images may be arranged in a checkered pattern within one picture. Alternatively, the left-eye image 170l and the right-eye image 170r may be arranged vertically or horizontally side by side within one picture.

The 3D video processing apparatus 100 according to the first embodiment of the present invention is described in detail below.

Figure 5:
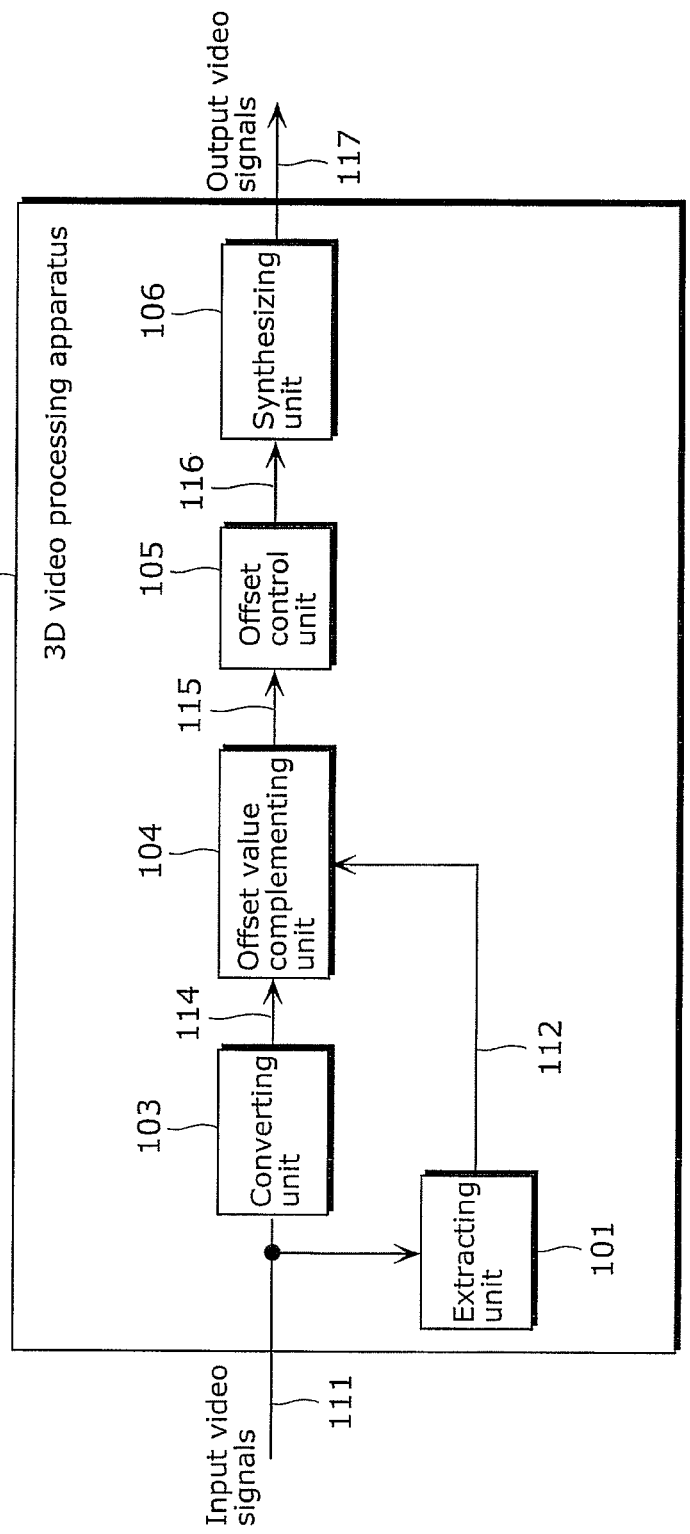
FIG. 5 is a block diagram showing a structure of a 3D video processing apparatus according to the first embodiment of the present invention.

FIG. 5 is a block diagram showing a structure of the 3D video processing apparatus 100.

The 3D video processing apparatus 100 shown in FIG. 5 generates the output video signals 117 representing a 3D video image which shows a subtitle or a menu image over a primary 3D video image included in the input video signals 111. This 3D video processing apparatus 100 includes an extracting unit 101, a converting unit 103, an offset value complementing unit 104, an offset control unit 105, and a synthesizing unit 106.

The extracting unit 101 extracts offset information 112 included in the input video signals 111.

Figure 6:
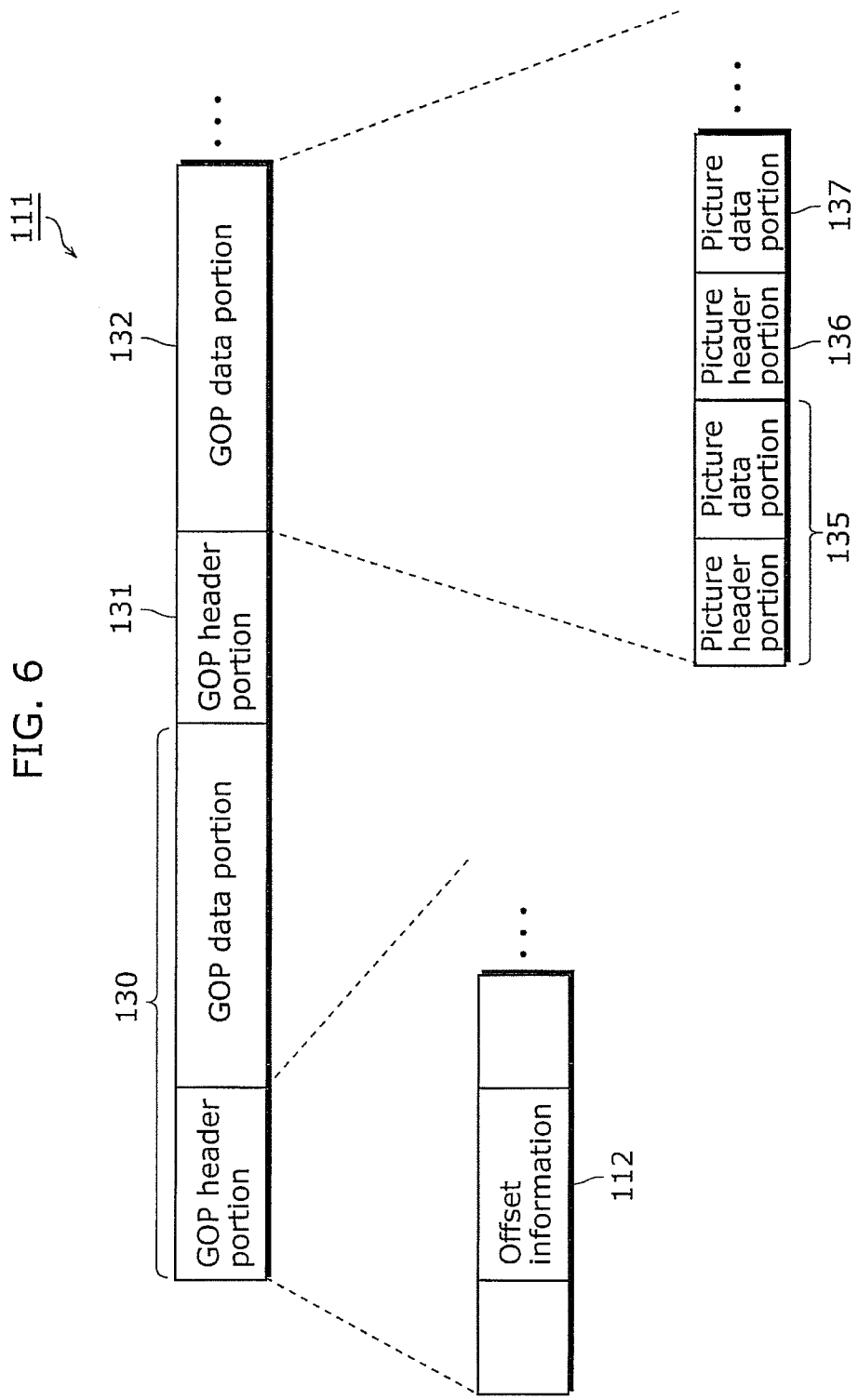
FIG. 6 shows a structure of an input video signal according to the first embodiment of the present invention.

FIG. 6 shows a structure of the input video signal 111. As shown in FIG. 6, the input video signal 111 includes a plurality of GOP data 130 that are data on a per group-of-pictures (GOP) basis. Here, GOP indicates a unit of a plurality of pictures to be used for compression, reproduction, and so on.

Each of the GOP data 130 includes a GOP header portion 131 including control information for each GOP, and a GOP data portion 132 that is data of a plurality of pictures included in the GOP.

The GOP data portion 132 includes a plurality of picture data 135 each of which is data for one picture. Each of these picture data 135 includes a picture header portion 136 including control information for each picture, and a picture data portion 137 that is image data of the primary video image. The input video signal 111 includes subtitle data that is image data of a subtitle, a menu image, or the like. The subtitle data has an assigned identifier (PID) different from that of the video data and is stored in a transport stream (TS) separately from the video data.

The GOP header portion 131 includes the offset information 112. The offset information 112 indicates a shift amount of the subtitle or the menu image. In other words, the offset information 112 indicates an amount by which the subtitle or the menu image is shifted in the depth direction in the 3D presentation.

FIG. 7 shows a structure of the offset information 112. As shown in FIG. 7, the offset information 112 includes a frame rate 141, the initial PTS 142, the number of offset values 143, the number of frames 144, and a plurality of offset values 145. It is to be noted that the values and the number of bits shown in FIG. 7 are one example, and other values and number of bits than those shown in FIG. 7 may be possible.

The frame rate 141 indicates a frame rate of video data within the corresponding GOP.

The initial PTS 142 indicates a value of presentation time stamp (PTS) of the initial picture within the corresponding GOP. Here, PTS indicates a time stamp which indicates a point in time at which a picture is displayed.

The number of offset values 143 indicates the number of offset values 145 included in the corresponding offset information 112.

The number of frames 144 indicates the number of pictures (frames or fields) included in the corresponding GOP.

The offset values 145 are assigned to respective pictures included in the corresponding GOP. Furthermore, each of the offset values 145 includes an offset direction 146 and an absolute value of offset value 147. In the case where there is a plurality of subtitles and menu images which are available to display at the same time point, the offset value 145 is provided for each of the subtitles or the menu images. This means that, in such a case, there is a plurality of the offset values 145 for one picture. It is to be noted that the number of offset values 145 provided for one picture may be larger than the number of subtitles and menu images which are available to display at the same time point.

The offset direction 146 indicates the direction (right or left) in which the subtitle or the menu image for the corresponding picture is shifted. In other words, the offset direction 146 indicates whether the subtitle or the menu image for the corresponding picture is to be shifted back or forth in the depth direction in the 3D presentation.

The absolute value of offset value 147 indicates the absolute value of the corresponding offset value 145.

It is to be noted that the values of the frame rate 141 and the offset direction 146 shown in FIG. 7 represent meaning thereof, and actual values of the frame rate 141 and the offset direction 146 are values of data of one or more bits which are associated with such meaning.

Furthermore, the offset value 145 is data which is set, for each picture, to display the subtitle or the menu image in front of the primary video image.

Figure 8:
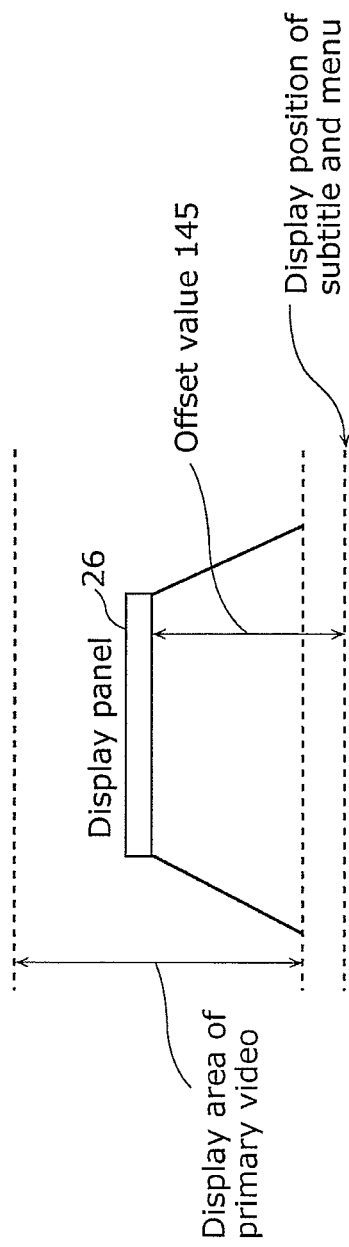
FIG. 8 shows a depth-wise display area of a primary video image and depth-wise display positions of a subtitle and a menu image according to the first embodiment of the present invention.

FIG. 8 shows a depth-wise display area of the primary video image and depth-wise display positions of the subtitle and the menu image. As shown in FIG. 8, the subtitle or the menu image is located in front of the display area of the primary video image so that a favorable 3D video can be displayed to a user.

The converting unit 103 generates converted video signals 114 by performing 3:2 pull-down processing on the input video signals 111.

Figure 9:
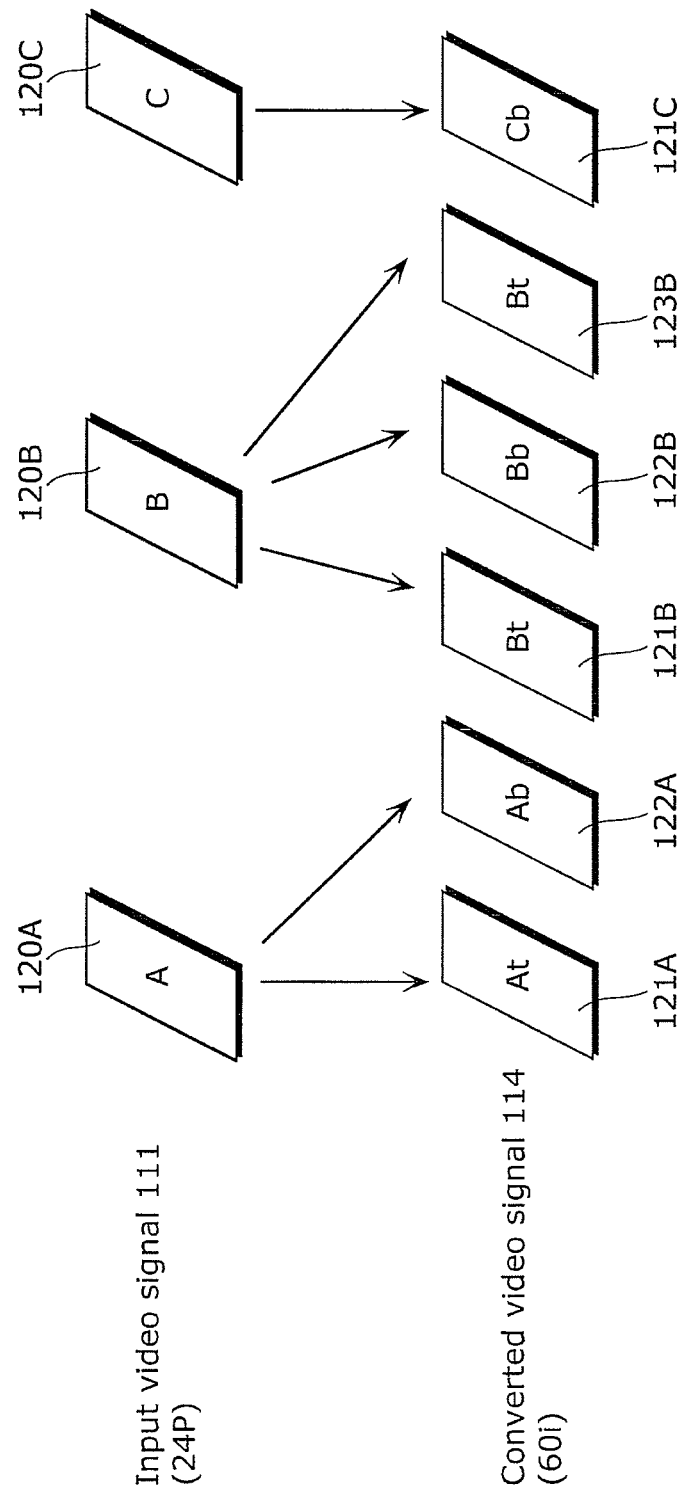
FIG. 9 shows processing of a converting unit according to the first embodiment of the present invention.

FIG. 9 shows the 3:2 pull-down processing. The 3:2 pull-down processing indicates processing of converting video data of 24p (progressive video at a frame rate of 24 fps) into video data of 60i (interlace video at a frame rate of 60 fps).

Specifically, the converting unit 103 converts two pictures (the primary video image and the subtitle) included in the input video signals 111, into five pictures. In other words, the converting unit 103 inserts one or two new pictures between two successive pictures included in the input video signals 111.

More specifically, the converting unit 103 generates two pictures 121A and 122A included in the converted video signals 114, using the first picture 120A included in the input video signals 111. Here, the picture 121A indicates a picture in which only odd numbered lines of the lines included in the picture 120A are copied (a top field). The picture 122A indicates a picture in which only even numbered lines of the lines included in the picture 120A are copied (a bottom field).

The converting unit 103 generates three pictures 121B, 122B, and 123B included in the converted video signals 114, using the second picture 120B included in the input video signals 111. Here, the pictures 121B and 123B indicate a picture in which only odd numbered lines of the lines included in the picture 120B are copied (a top field). The picture 122B indicates a picture in which only even numbered lines of the lines included in the picture 120B are copied (a bottom field).

The offset value complementing unit 104 complements the offset value 145 of each picture included in the converted video signals 114, using the offset value 145 (the offset value included in the input video signals 111) extracted by the extracting unit 101.

Figure 10:
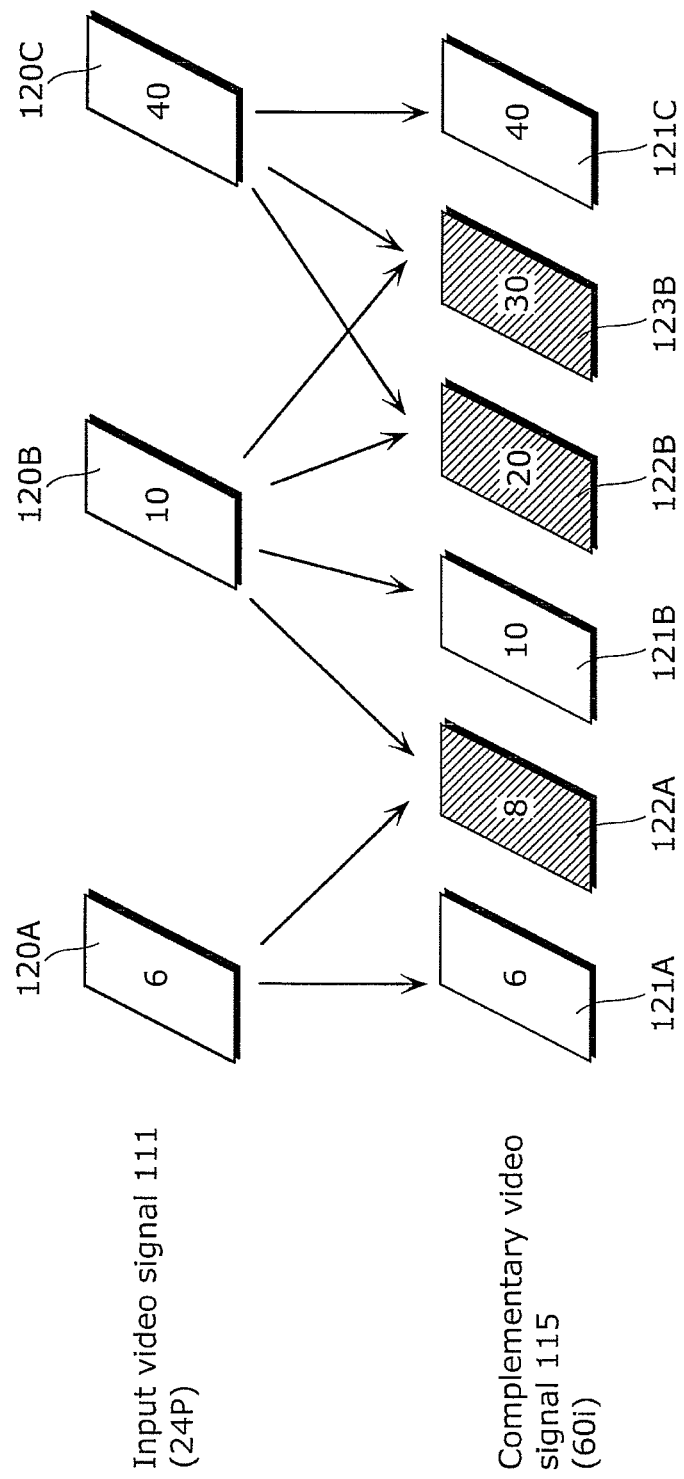
FIG. 10 shows processing of an offset value complementing unit according to the first embodiment of the present invention.

FIG. 10 shows the processing of the offset value complementing unit 104.

First, the offset value complementing unit 104 sets the offset values 145 of the initial pictures 121A, 121B, and 121C (hereinafter referred to as "the initial pictures") of two or three pictures generated from one original picture, to have the same values as the offset values 145 of the corresponding original pictures 120A, 120B, and 120C.

Next, the offset value complementing unit 104 calculates the offset values 145 of the pictures 122A, 122B, and 123B (hereinafter referred to as "complementary pictures"), other than the initial pictures, of the two or three pictures generated from the one original picture, using the offset values 145 of the initial pictures each of which temporally immediately precedes the corresponding complementary picture and is hereinafter referred to as "a last initial picture", and the offset values 145 of the initial pictures each of which temporally immediately succeeds the corresponding complementary picture and is hereinafter referred to as "a next initial picture". In other words, the offset value complementing unit 104 calculates the offset value 145 of the complementary picture using the offset value 145 of the original picture of that complementary picture and the offset value 145 of the next picture of that original picture included in the input video signals 111.

Specifically, the offset value complementing unit 104 calculates the offset value 145 of the complementary picture such that the offset value 145 of the complementary picture changes smoothly at regular intervals with respect to the offset value 145 of the last initial picture and the offset value 145 of the next initial picture.

More specifically, the offset value complementing unit 104 calculates an offset value O(i) of the complementary picture located at the i-th position ($1 \leq i \leq n$) from the last initial picture, using the Expression 1 indicated below. In the expression, n represents the number of complementary pictures inserted between the last initial picture and the next initial picture. Furthermore, M1 represents the smaller one of the offset values 145 of the last initial picture and the next initial picture, and M2 represents the larger one of the offset values 145 of the last initial picture and the next initial picture.

$$O(i) = M1 + (M2 - M1) \times i/(n+1) \quad \text{(Expression 1)}$$

For example, for the complementary picture 122A shown in FIG. 10, the offset value 145 of the last initial picture 121A is "6", the offset value 145 of the next initial picture 121B is "10", n=1, and i=1. Thus, the offset value 145 of the complementary picture 122A will be "8" according to the above Expression 1.

In addition, the offset value complementing unit 104 outputs, to the offset control unit 105, a complementary video signal 115 obtained by adding the generated offset value 145 to the converted video signal 114.

It is to be noted that the complementary picture, the last initial picture, and the next initial picture correspond to the first picture, the second picture, and the third picture, respectively, in the present invention.

The offset control unit 105 generates an adjusted video signal 116 by shifting the subtitle or the menu image by an amount corresponding to a value indicated by the offset value 145 generated by the offset value complementing unit 104. In other words, the offset control unit 105 shifts the depth-wise position of the subtitle or the menu image in the 3D presentation, by a distance which corresponds to the offset value 145 generated by the offset value complementing unit 104. By so doing, the offset control unit 105 adjusts the depth-wise display position of the subtitle or the menu image so that it is in front of the display position of the primary video in the 3D presentation.

Figure 11:
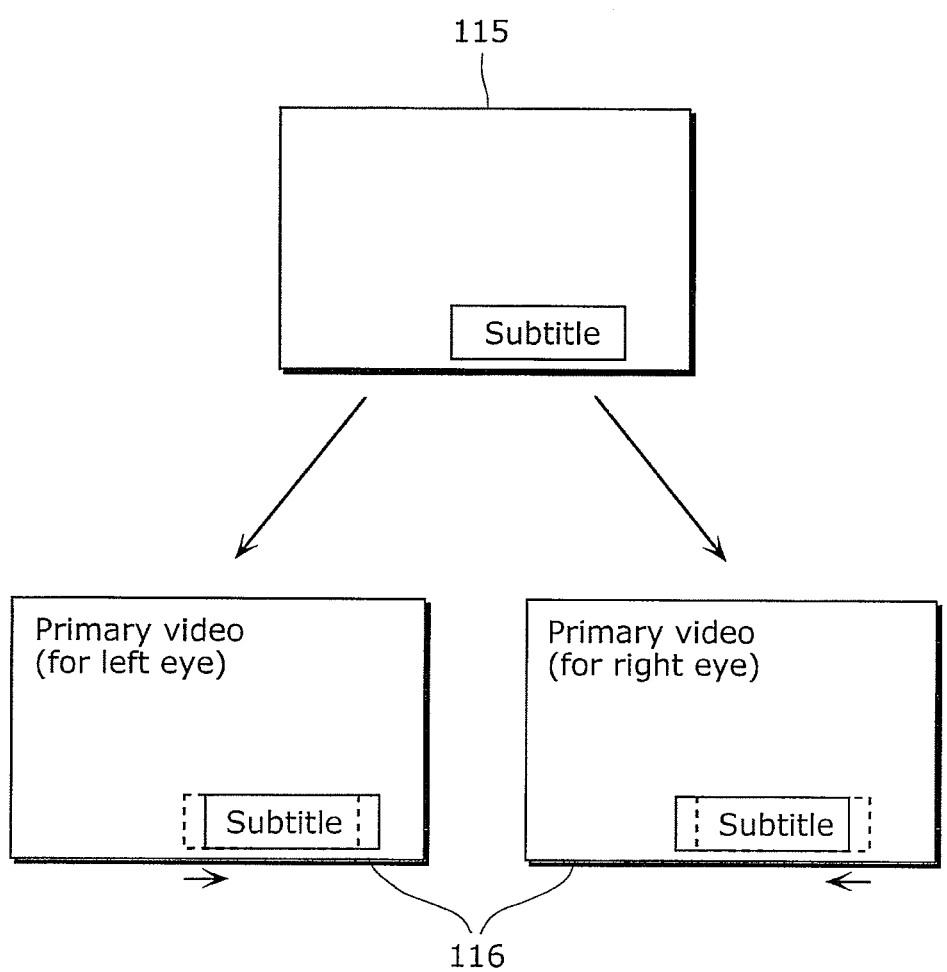
FIG. 11 shows processing of an offset control unit according to the first embodiment of the present invention.

FIG. 11 shows the processing of the offset control unit 105.

As shown in FIG. 11, the offset control unit 105 shifts, in the horizontal direction, a subtitle image included in the complementary video signals 115, by an amount corresponding to the offset value 145.

Here, FIG. 11 shows the case where the depth-wise display position of the subtitle image is originally on the display panel 26. In other words, FIG. 11 shows an example where the complementary video signals 115 contain only one subtitle image (or the same subtitle image) for the left eye and for the right eye.

Figure 12:
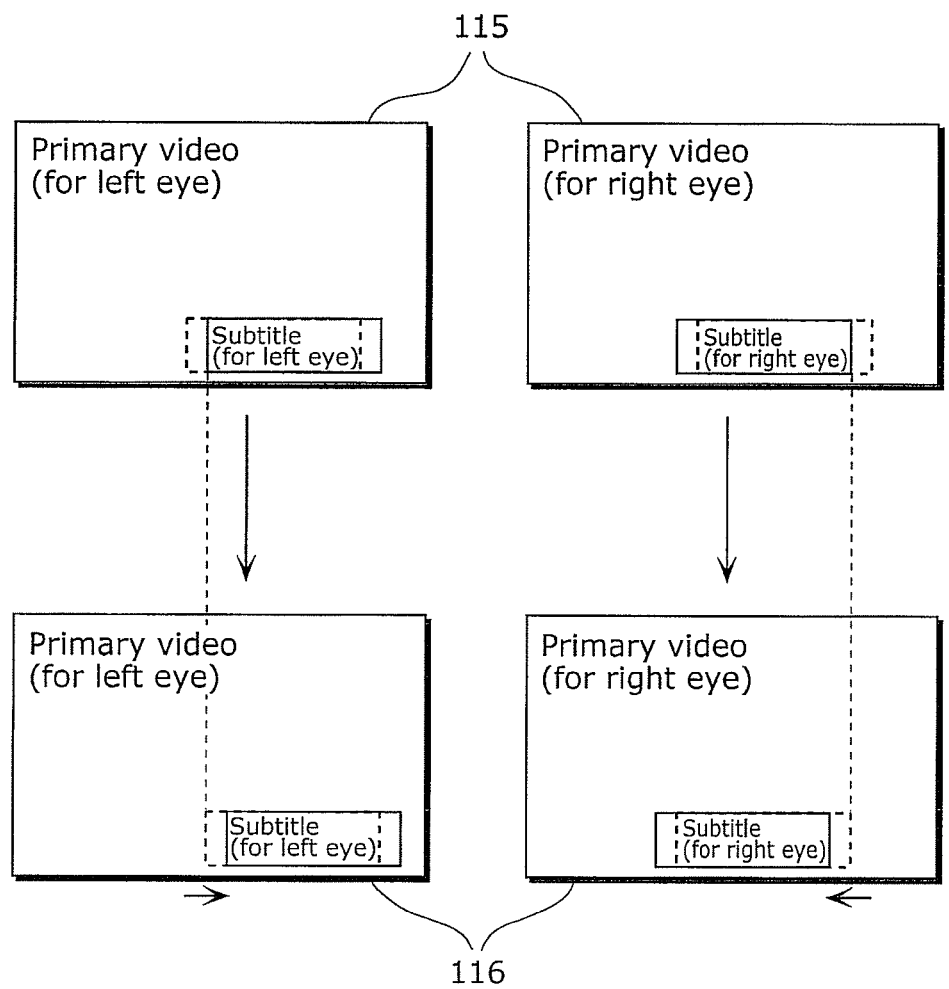
FIG. 12 shows a variation of the processing of the offset control unit according to the first embodiment of the present invention.

It is to be noted that the complementary video signals 115 (the input video signals 111) may contain a left-eye subtitle image and a right-eye subtitle image. In other words, the original display position of the subtitle image may be other than on the display panel 26. In this case, as shown in FIG. 12, the offset control unit 105 shifts, in the horizontal direction, each of the left-eye subtitle image and the right-eye subtitle image included in the complementary video signals 115, by an amount corresponding to the offset value 145.

Furthermore, the information indicated by the offset direction 146 included in the offset value 145 may indicate a direction in which the image is to be shifted or may indicate a depth-wise direction (either forward or backward) in the 3D presentation. That is, in the latter case, the offset control unit 105 is designed to determine whether the current image is for left eye or for right eye, and according to the determination result, determine a direction in which the image is to be shifted. For example, according to whether each of the current images is for left eye or for right eye, the offset control unit 105 shifts the images in opposite directions (to left and to right).

The synthesizing unit 106 generates the output video signal 117 displayed by superimposing the subtitle included in the adjusted video signal 116, onto the primary video image included in the converted video signal 114.

The following describes a processing flow of the 3D video processing apparatus 100.

Figure 13:
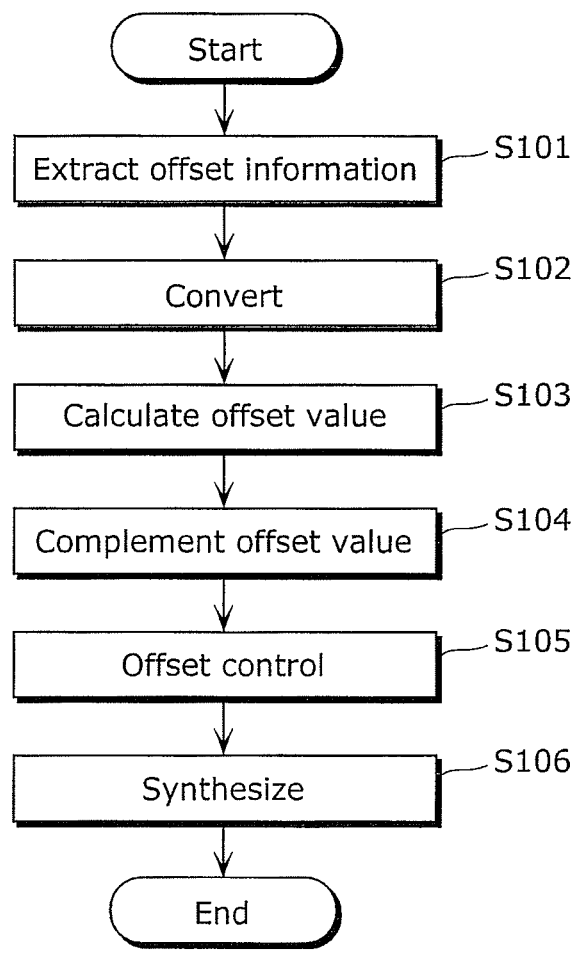
FIG. 13 is a flowchart showing a processing flow of the 3D video processing apparatus according to the first embodiment of the present invention.

FIG. 13 is a flowchart showing the processing flow of the 3D video processing apparatus 100. The 3D video processing apparatus 100 executes the processing shown in FIG. 13, on a per GOP basis.

First, the extracting unit 101 extracts the offset information 112 of the GOP included in the input video signals 111 (S101).

In the meantime, the converting unit 103 generates the converted video signals 114 by performing the 3:2 pull-down processing on the result obtained by decoding the video data included in the input video signals 111 (S102).

Next, the offset value complementing unit 104 calculates a new offset value 145 using the offset value 145 extracted by the extracting unit 101 (S103).

Next, the offset value complementing unit 104 assigns the calculated offset value 145 as the offset value 145 of each picture included in the converted video signals 114 (S104).

Next, the offset control unit 105 generates the adjusted video signal 116 by shifting the subtitle or the menu image by an amount corresponding to a value indicated by the offset value 145 generated by the offset value complementing unit 104 (S105).

Next, the synthesizing unit 106 generates the output video signal 117 displayed by superimposing the subtitle included in the adjusted video signal 116, onto the primary video image included in the converted video signals 114 (S106).

By so doing, the 3D video processing apparatus 100 according to the first embodiment of the present invention is capable of successively and smoothly changing the depth-wise display position of the subtitle, by calculating the offset value 145 of each picture generated through the 3:2 pull-down processing, using the offset values 145 of the preceding and succeeding pictures. This allows the 3D video processing apparatus 100 according to the first embodiment of the present invention to produce better 3D video images for users.

While the above description illustrates an example where the 3D video processing apparatus according to the first embodiment of the present invention is applied to the 3D video processing apparatus 100 included in the digital video recorder 30, it may be applied to the 3D video processing apparatus 100B included in the digital television 20.

Furthermore, while the 3D video processing apparatus 100 includes the synthesizing unit 106 in the above description, the synthesizing unit 106 may not be provided, and the adjusted video signals 116 may be output as the output video signals 117. In this case, it is sufficient that a processing apparatus (e.g., the digital television 20) in the subsequent stage includes the synthesizing unit 106.

Furthermore, while the extracting unit 101 extracts the offset information 112 included in the input video signals 111 in the above description, it may be such that the converting unit 103 generates the converted video signals 114 which include the offset information 112 included in the input video signals 111, and the extracting unit 101 extracts the offset information 112 included in the converted video signals 114.

Furthermore, the above description illustrates an example where the offset information 112 (the offset value 145) is included for each of the GOPs, the offset information 112 (the offset value 145) may be included for each of other units. For example, the offset information 112 (the offset value 145) may be included for each of the pictures.

In addition, the structure of the offset information 112 shown in FIG. 7 is an example, and it is sufficient that the offset information 112 includes a plurality of offset values 145 and information with which the correspondence relation between each of the offset values 145 and a frame is discriminated. For example, it is possible that the offset information 112 includes only one of the number of offset values 143 and the number of frames 144. Moreover, the offset information 112 may include the PTS of each of the offset values 145 instead of the frame rate 141 and the initial PTS 142.

Furthermore, while the above description illustrates an example where the converting unit 103 converts the video signals of 24p into the video signals of 60i, any conversion processing is possible as long as it increases the frame rate. For example, the converting unit 103 may convert the video signals of 24p into the video signals of 60p or signals at other frame rate. Moreover, the picture to be inserted by the converting unit 103 is not limited to a picture generated by copying part or all of the original picture, and may be a picture generated using a temporally preceding or succeeding picture.

Furthermore, while the above description illustrates an example where the offset value complementing unit 104 calculates the offset value 145 of the complementary picture using the above Expression 1, the method of calculating the offset value 145 of the complementary picture may be different from the above-described method. Specifically, it is sufficient that the offset value complementing unit 104 complements the offset value of the complementary picture using the offset value 145 extracted by the extracting unit 101, by assigning, to the complementary picture, the offset value which is equal to or greater than the first offset value and is equal to or smaller than the second offset value, where the first offset value represents the smaller one of the offset value 145 assigned to the last initial picture and the offset value 145 assigned to the next initial picture, and the second offset value represents the larger one of the offset value 145 assigned to the last initial picture and the offset value 145 assigned to the next initial picture.

For example, the offset value complementing unit 104 may set the offset value 145 of the complementary picture at a value (e.g., "7 to 9") between the offset value (e.g., "6") of the last initial picture and the offset value (e.g., "10") of the next initial picture.

Alternatively, the offset value complementing unit 104 may set the offset value 145 of the complementary picture at the offset value (e.g., "6") of the last initial picture or the offset value (e.g., "10") of the next initial picture.

In the case of inserting the two complementary pictures 122B and 123B, it is preferable to determine the offset values 145 of the complementary picture 122B and the complementary picture 123B so that the offset value 145 monotonically increases or monotonically decreases through the last initial picture 121B, the complementary picture 122B, the complementary picture 123B, and the next initial picture 121C. This allows the 3D video processing apparatus 100 to successively and smoothly change the depth-wise display position of the subtitle.

In addition, as described above, it is more preferable that the offset value complementing unit 104 calculate the offset value 145 of the complementary picture using the above Expression 1. This enables a more smooth change of the depth-wise display position of the subtitle.

Furthermore, while the above description illustrates an example where the offset value 145 indicates a shift amount of the subtitle or the menu image, it is sufficient that the offset value 145 indicates a shift amount of at least part of a picture. For example, the offset value 145 may indicate a shift amount of a secondary video image or a primary video image in the case where the secondary video image is superimposed on the primary video image when displayed.

Furthermore, the offset value 145 may indicate a shift amount of a primary video image in the case where only the primary video image is displayed.

Furthermore, the offset value 145 may be provided for each object (subject) included in the 3D video. Alternatively, in the case where the 3D video signals include, for each object included therein, information which indicates the depth-wise position of the object, the offset control unit 105 may determine a shift amount for each object using such information and the offset value 145. Alternatively, the offset control unit 105 may first calculate a parallax (the depth-wise position) of each object from the left-eye video image and the right-eye video image of the 3D video, and then determine, using such a parallax and the offset value 145, the shift amount for each object.

Second Embodiment

The above first embodiment describes the example where the offset value 145 of the newly created picture is complemented. A 3D video processing apparatus 200 according to the second embodiment of the present invention complements the offset value 145 of a picture which includes an error, using the offset values 145 of the preceding and succeeding pictures.

It is to be noted that the 3D video processing apparatus 200 according to the second embodiment of the present invention is applicable to the 3D video display system 10 shown in FIG. 1, as in the case of the above first embodiment.

Figure 14:
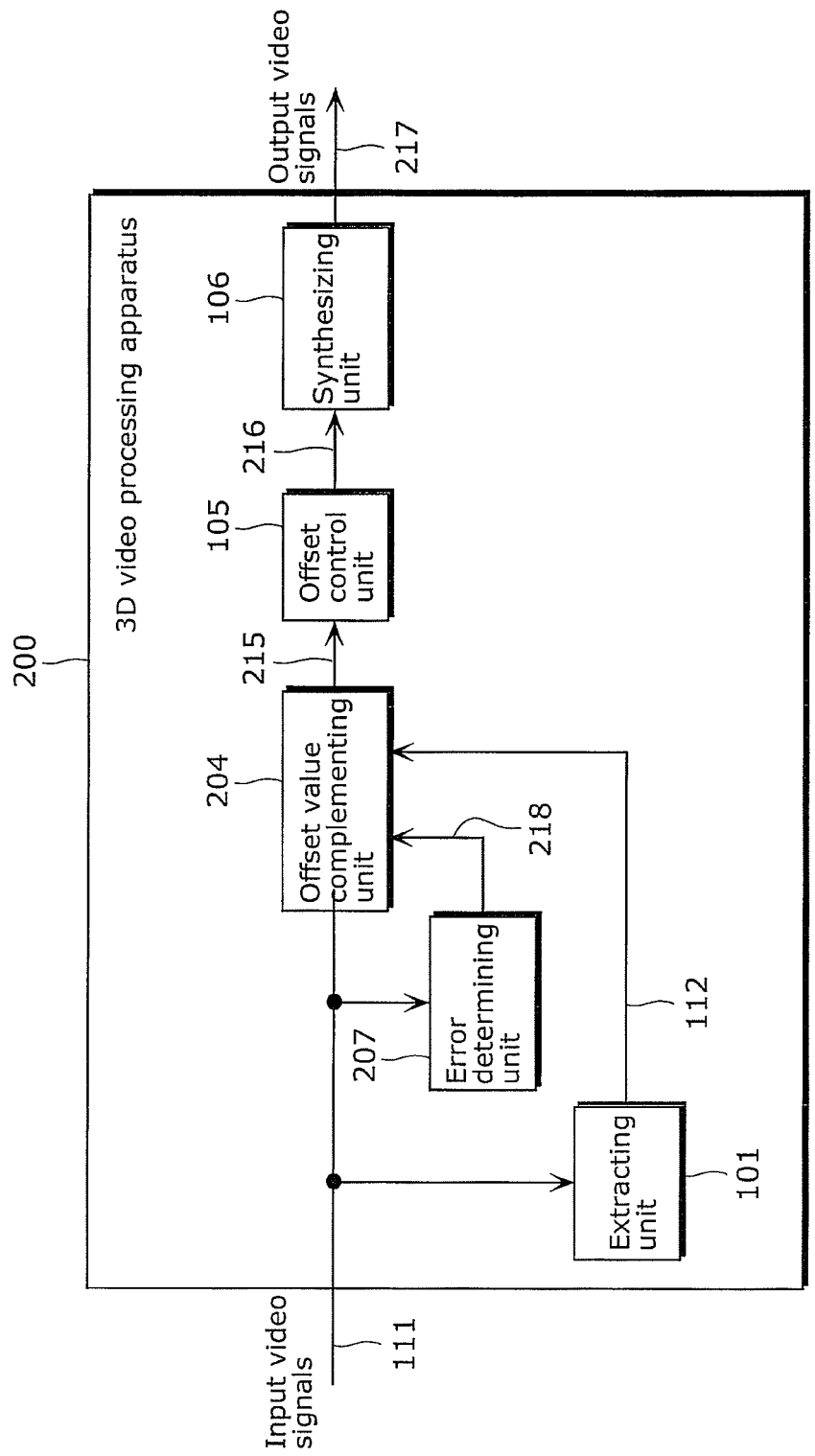
FIG. 14 is a block diagram showing a structure of the 3D video processing apparatus according to the second embodiment of the present invention.

FIG. 14 is a block diagram showing a structure of the 3D video processing apparatus 200 according to the second embodiment of the present invention. Components common with FIG. 5 have the same numerals, and overlapping descriptions thereof are omitted.

The 3D video processing apparatus 200 shown in FIG. 14 generates output video signals 217 representing a 3D video image which shows a subtitle or a menu image over a primary 3D video image included in the input video signals 111. This 3D video processing apparatus 200 includes the extracting unit 101, an offset value complementing unit 204, the offset control unit 105, the synthesizing unit 106, and an error determining unit 207.

The extracting unit 101 extracts the offset information 112 included in the input video signals 111.

The error determining unit 207 determines whether or not the offset information is appropriate. Specifically, the error determining unit 207 determines whether or not the offset value 145 is an appropriate value. Furthermore, the error determining unit 207 outputs an error determination signal 218 indicating the result of the above determination.

When the error determination signal 218 indicates that the offset value 145 is not appropriate, the offset value complementing unit 204 complements the offset value 145 of the picture included in the input video signals 111, using the offset value 145 extracted by the extracting unit 101 (the offset value included in the input video signals 111).

Figure 15:
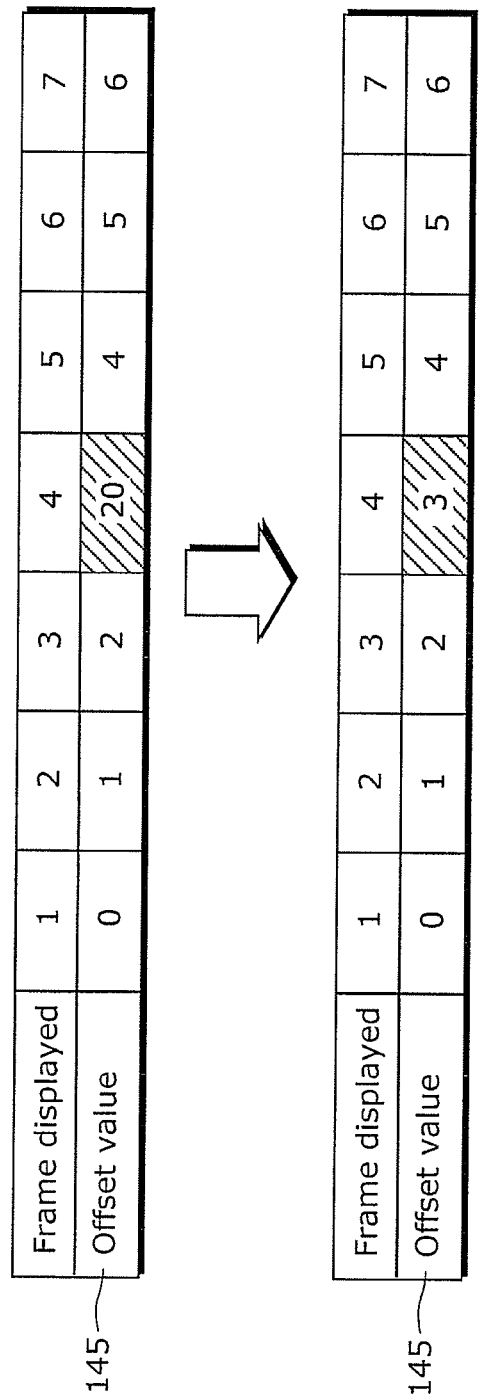
FIG. 15 shows processing of an offset value complementing unit according to the second embodiment of the present invention.

FIG. 15 shows the processing of the offset value complementing unit 204.

For example, as shown in FIG. 15, when the offset value 145 of the frame 4 is not appropriate, the offset value complementing unit 204 complements the offset value 145 of that frame 4. In the following description, a picture whose offset value 145 is not appropriate is referred to as an error picture while a picture whose offset value 145 is appropriate is referred to as a normal picture.

Specifically, the offset value complementing unit 204 calculates the offset value 145 of the error picture using the offset value 145 of the normal picture which temporally immediately precedes the error picture and is hereinafter referred to as "last normal picture", and the offset value 145 of the normal picture which temporally immediately succeeds the frame 4 and is hereinafter referred to as "next normal picture".

More specifically, the offset value complementing unit 204 calculates the offset value 145 of the error picture such that the offset value 145 of the error picture changes smoothly at regular intervals with respect to the offset value 145 of the last normal picture and the offset value 145 of the next normal picture.

More specifically, the offset value complementing unit 204 calculates an offset value O(i) of the error picture located at the i-th position ($1 \leq i \leq n$) from the last normal picture, using the Expression 1 indicated above. In the expression, n represents the number of error pictures inserted between the last normal picture and the next normal picture. Furthermore, M1 represents the smaller one of the offset values 145 of the last normal picture and the next normal picture, and M2 represents the larger one of the offset values 145 of the last normal picture and the next normal picture.

For example, in the example shown in FIG. 15, the offset value 145 of the last normal picture is "2", the offset value 145 of the next normal picture is "4", n=1, and i=1. Thus, the offset value 145 of the error picture will be "3" according to the above Expression 1.

In addition, the offset value complementing unit 204 outputs, to the offset control unit 105, a complementary video signal 215 obtained by complementing the offset value 145 of the error picture included in the input video signals 111.

It is to be noted that the error picture, the last normal picture, and the next normal picture correspond to the first picture, the second picture, and the third picture, respectively, in the present invention.

The offset control unit 105 generates an adjusted video signal 216 by shifting the subtitle or the menu image by an amount corresponding to a value indicated by the offset value 145 included in the complementary video signal 215. In other words, the offset control unit 105 shifts the depth-wise position of the subtitle or the menu image in the 3D presentation, by a distance which corresponds to the offset values 145 generated by the offset value complementing unit 204.

The synthesizing unit 106 generates an output video signal 217 displayed by superimposing the subtitle included in the adjusted video signal 216, onto the primary video image included in the input video signal 111.

The following describes a processing flow of the 3D video processing apparatus 200.

Figure 16:
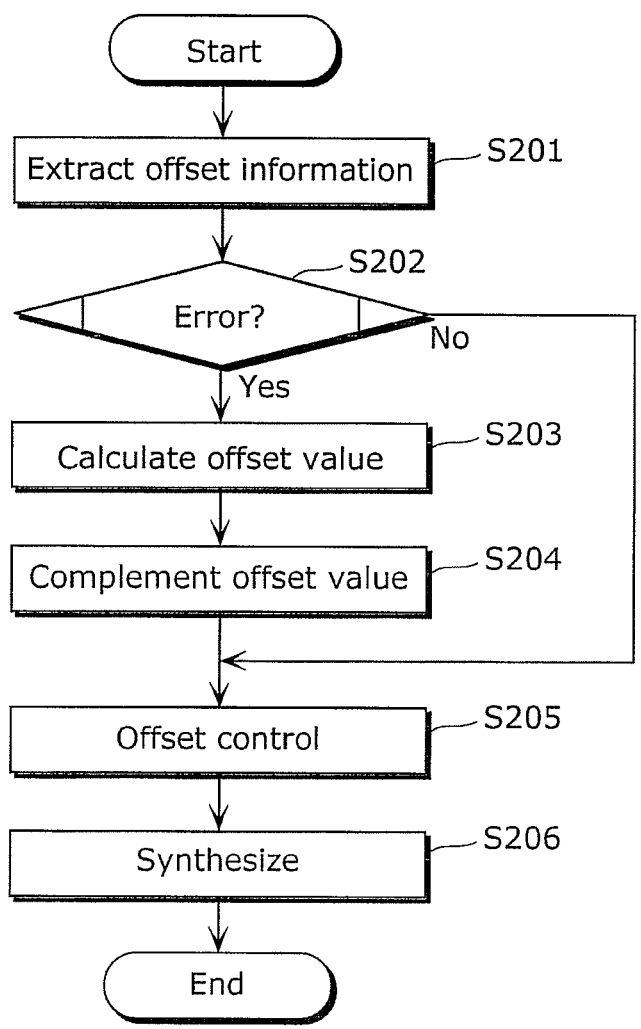
FIG. 16 is a flowchart showing a processing flow of the 3D video processing apparatus according to the second embodiment of the present invention.

FIG. 16 is a flowchart showing the processing flow of the 3D video processing apparatus 200. The 3D video processing apparatus 200 executes the processing shown in FIG. 16, on a per GOP basis.

First, the extracting unit 101 extracts the offset information 112 that is included in the input video signals 111 and on a per GOP basis (S201).

Next, the error determining unit 207 determines whether or not the offset value 145 is an appropriate value (S202).

Figure 17:
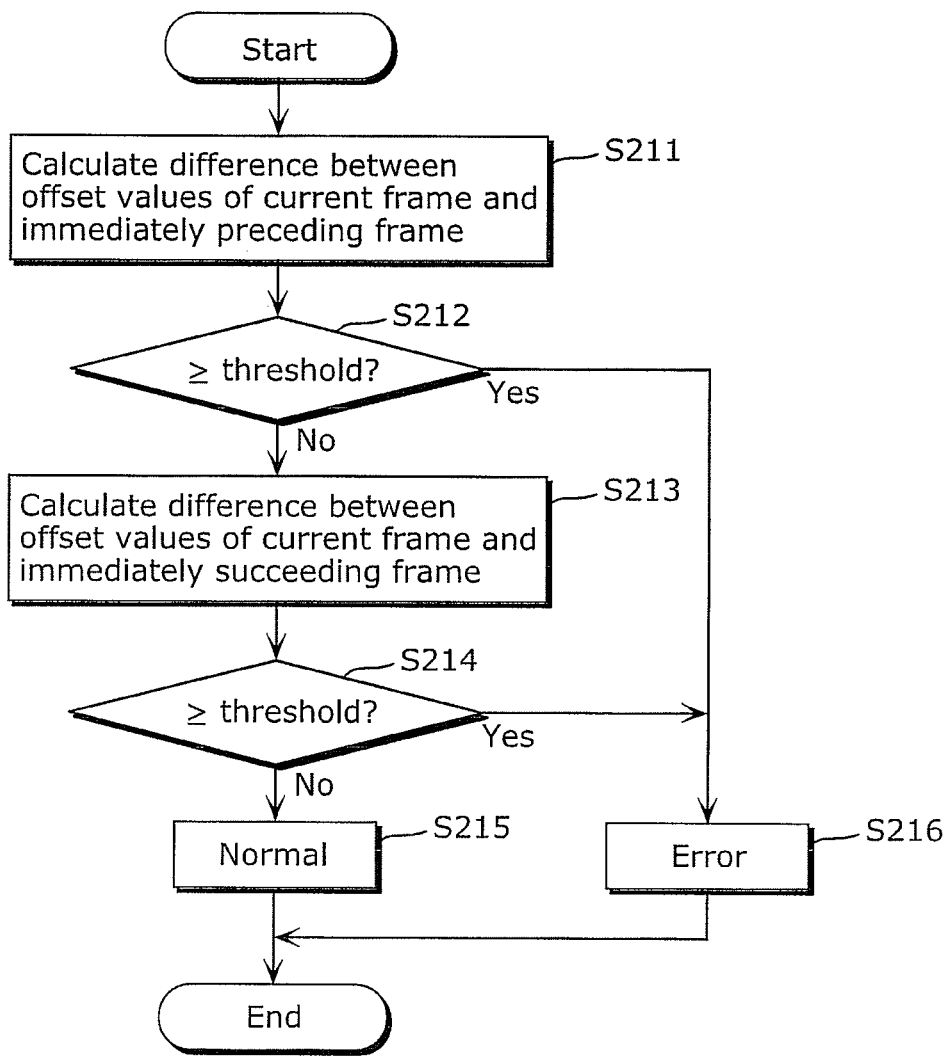
FIG. 17 is a flowchart showing a processing flow of an error determining unit according to the second embodiment of the present invention.

FIG. 17 is a flowchart showing the flow of the error determination process (S202) in the error determining unit 207. The error determining unit 207 executes the processing shown in FIG. 17, on a per frame (picture) basis.

First, the error determining unit 207 calculates the difference between the offset value 145 of the current frame and the offset value 145 of the immediately preceding frame with respect to the current frame (S211).

Next, the error determining unit 207 determines whether or not the difference calculated in Step S211 is equal to or greater than the first predetermined threshold (S212).

When the difference calculated in Step S211 is equal to or greater than the first threshold (Yes in S212), the error determining unit 207 determines that the offset value 145 of the current frame is not appropriate (S216).

On the other hand, when the difference calculated in Step S211 is smaller than the first threshold (No in S212), then the error determining unit 207 calculates the difference between the offset value 145 of the current frame and the offset value 145 of the immediately succeeding frame with respect to the current frame (S213).

Next, the error determining unit 207 determines whether or not the difference calculated in Step S213 is equal to or greater than the second predetermined threshold (S214). This second threshold and the above first threshold may be the same or different values.

When the difference calculated in Step S213 is equal to or greater than the second threshold (Yes in S214), the error determining unit 207 determines that the offset value 145 of the current frame is not appropriate (S216).

On the other hand, the difference calculated in Step S213 is smaller than the second threshold (No in S214), the error determining unit 207 determines that the offset value 145 of the current frame is appropriate (S215).

While the error determining unit 207 herein makes both the determinations on whether or not the difference in the offset value 145 between the current frame and the immediately preceding frame is equal to or greater than the threshold (S211 and S212) and whether or not the difference in the offset value 145 between the current frame and the immediately succeeding frame is equal to or greater than the threshold (S213 and S214), it is also possible that the error determining unit 207 makes only one of these determinations. In addition, these two processes may be executed in reverse order, and part of these two processes may be executed at the same time.

With reference to FIG. 16 again, further description is set forth below.

When it is determined in Step S202 that the offset value 145 is not an appropriate value (Yes in S202), then the offset value complementing unit 204 calculates a new offset value 145 using the offset value 145 extracted by the extracting unit 101 (S203).

Next, the offset value complementing unit 204 assigns the calculated offset value 145 as the offset value 145 of the error picture (S204).

Next, the offset control unit 105 generates the adjusted video signal 216 by shifting the subtitle or the menu image by an amount corresponding to a value indicated by the offset value 145 generated by the offset value complementing unit 204 (S205).

Next, the synthesizing unit 106 generates the output video signal 217 displayed by superimposing the subtitle included in the adjusted video signal 216, onto the primary video image included in the input video signal 111 (S206).

On the other hand, when it is determined in Step S202 that the offset value 145 is an appropriate value (No in S202), then the offset control unit 105 generates the adjusted video signal 216 by shifting the subtitle or the menu image by an amount corresponding to a value indicated by the offset value 145 included in the input video signal 111 (S205).

Next, the synthesizing unit 106 generates the output video signal 217 displayed by superimposing the subtitle included in the adjusted video signal 216, onto the primary video image included in the input video signal 111 (S206).

By so doing, the 3D video processing apparatus 200 according to the second embodiment of the present invention is capable of successively and smoothly changing the depth-wise display position of the subtitle, by calculating the offset value 145 of the error picture using the offset values 145 of the preceding and succeeding pictures. This allows the 3D video processing apparatus 200 according to the second embodiment of the present invention to produce better 3D video images for users.

It is to be noted that the error determining unit 207 may perform the processing indicated below instead of the processing shown in FIG. 17.

Figure 18:
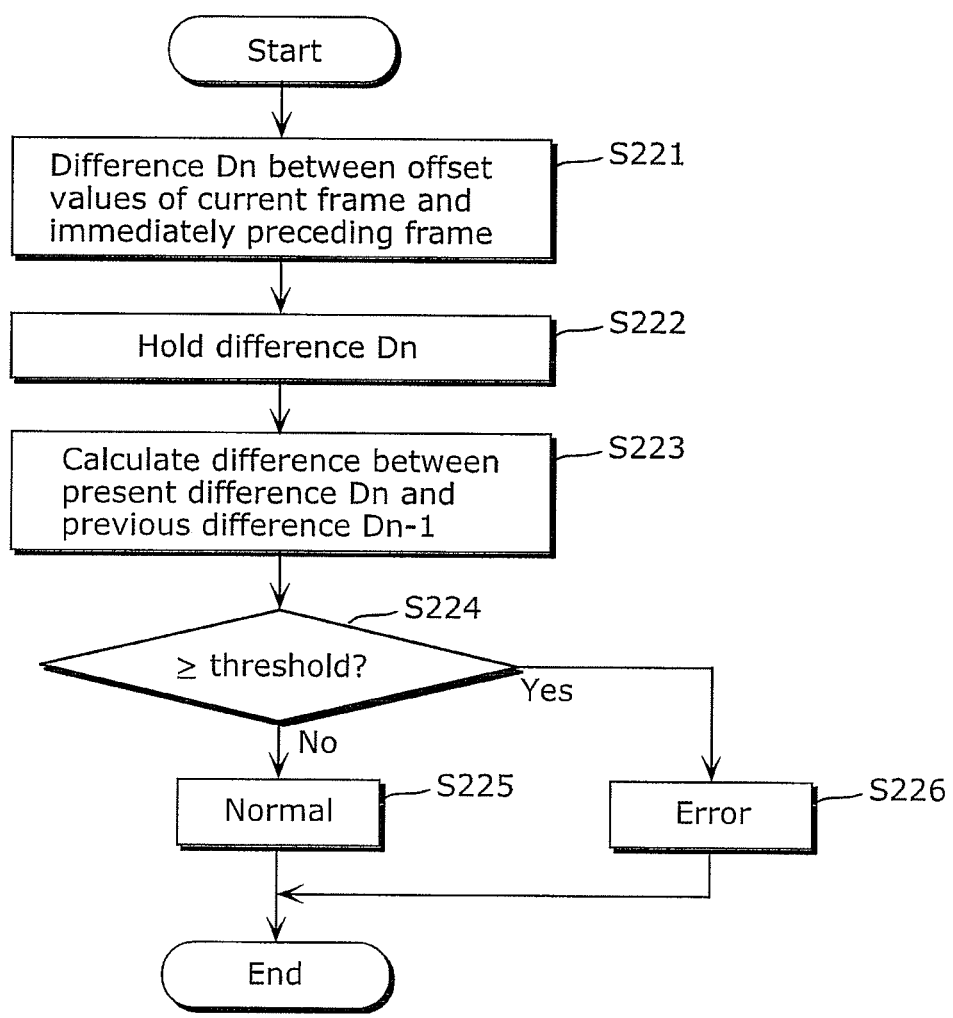
FIG. 18 is a flowchart showing a variation of the processing of the error determining unit according to the second embodiment of the present invention.

FIG. 18 is a flowchart according to a variation of the error determination process in the error determining unit 207.

As shown in FIG. 18, first, the error determining unit 207 calculates the difference Dn in the offset value 145 between the current frame and the frame immediately preceding the current frame (S221).

Next, the error determining unit 207 holds the difference Dn calculated in Step S221 (S222).

Next, the error determining unit 207 calculates the difference between the present difference Dn and the previous difference Dn−1 (the difference in the offset value 145 between the frame which is located two frames before and the frame which is located immediately before) (S223).

Next, the error determining unit 207 determines whether or not the difference calculated in Step S223 is equal to or greater than the third predetermined threshold (S224).

When the difference calculated in Step S224 is equal to or greater than the third threshold (Yes in S224), the error determining unit 207 determines that the offset value 145 of the current frame is not appropriate (S226).

On the other hand, the difference calculated in Step S224 is smaller than the third threshold (No in S224), the error determining unit 207 determines that the offset value 145 of the current frame is appropriate (S225).

The above processing allows the error determining unit 207 to determine that the offset value 145 of the current picture is inappropriate when the amount of change in the offset value 145 from the immediately preceding picture to the current picture increases abruptly from the immediately previous amount of change in the offset value 145.

It is to be noted that the error determining unit 207 may determine, in Step S223, the difference between the average value, the maximum value, or the minimum value of two or more differences held in Step S222, and the difference Dn calculated in the present Step S221.

Furthermore, the error determining unit 207 may further perform the like processing on the difference in the offset value 145 between the current frame and the immediately succeeding frame.

Furthermore, the error determining unit 207 may perform the processing indicated below instead of the processing shown in FIG. 17 or FIG. 18.

Figure 19:
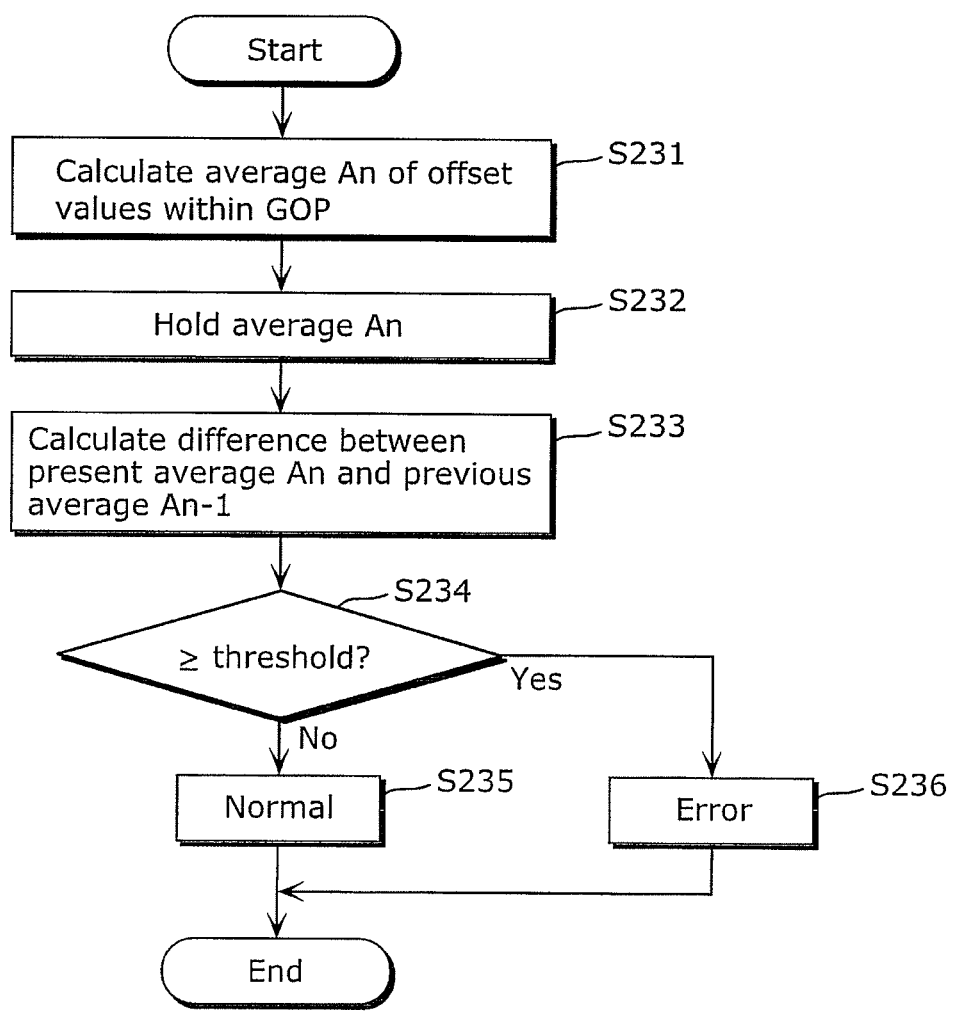
FIG. 19 is a flowchart showing a flow of the variation of the processing of the error determining unit according to the second embodiment of the present invention.

FIG. 19 is a flowchart according to a variation of the error determination process in the error determining unit 207. The error determining unit 207 executes the processing shown in FIG. 19, on a per GOP basis.

First, the error determining unit 207 calculates the average An of the offset values 145 within GOP (S231).

Next, the error determining unit 207 holds the average An calculated in Step S231 (S232).

Next, the error determining unit 207 calculates the difference between the average An of the current GOP and the average An−1 of the immediately preceding GOP (S233).

Next, the error determining unit 207 determines whether or not the difference calculated in Step S233 is equal to or greater than the fourth predetermined threshold (S234).

When the difference calculated in Step S234 is equal to or greater than the fourth threshold (Yes in S234), the error determining unit 207 determines that the offset value 145 of the current GOP is not appropriate (S236).

On the other hand, the difference calculated in Step S234 is smaller than the fourth threshold (No in S234), the error determining unit 207 determines that the offset value 145 of the current GOP is appropriate (S235).

The above processing allows the error determining unit 207 to determine, on a per GOP basis, whether or not the offset value 145 is appropriate.

It is to be noted that the error determining unit 207 may use the maximum value or the minimum value instead of the average of the offset values 145 included in the GOP. Furthermore, the error determining unit 207 may compare the offset value 145 of the last frame within the immediately preceding GOP with the offset value 145 of the initial frame within the current GOP.

In addition, in the case where the error determining unit 207 has determined an error in the offset value 145 on a per GOP basis, it is sufficient that the offset value complementing unit 204 performs the complementing operation in the same manner as above using the offset value 145 of the last frame within the immediately preceding normal GOP and the offset value 145 of the initial frame of the immediately succeeding normal GOP.

Furthermore, the error determining unit 207 may carry out two or more of the above-described error determination processes shown in FIG. 17 to FIG. 19 and variations thereof.

Furthermore, the same sort of variations as the above-described first embodiment may be applied to the 3D video processing apparatus 100.

Furthermore, the 3D video processing apparatus 200 may further determine whether or not the initial PTS 142 included in the offset information 112 is appropriate, and complement the initial PTS 142 when it is not appropriate.

Figure 20:
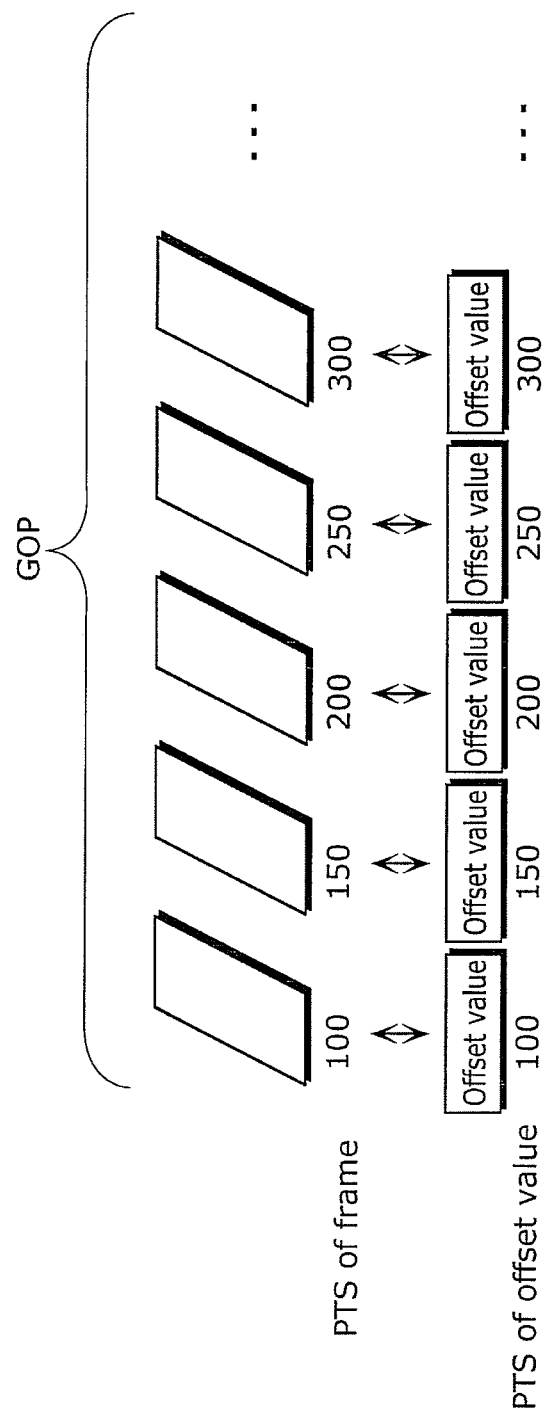
FIG. 20 shows a relation between PTSs of frames and PTSs of offset values in the normal case, according to the second embodiment of the present invention.
Figure 21:
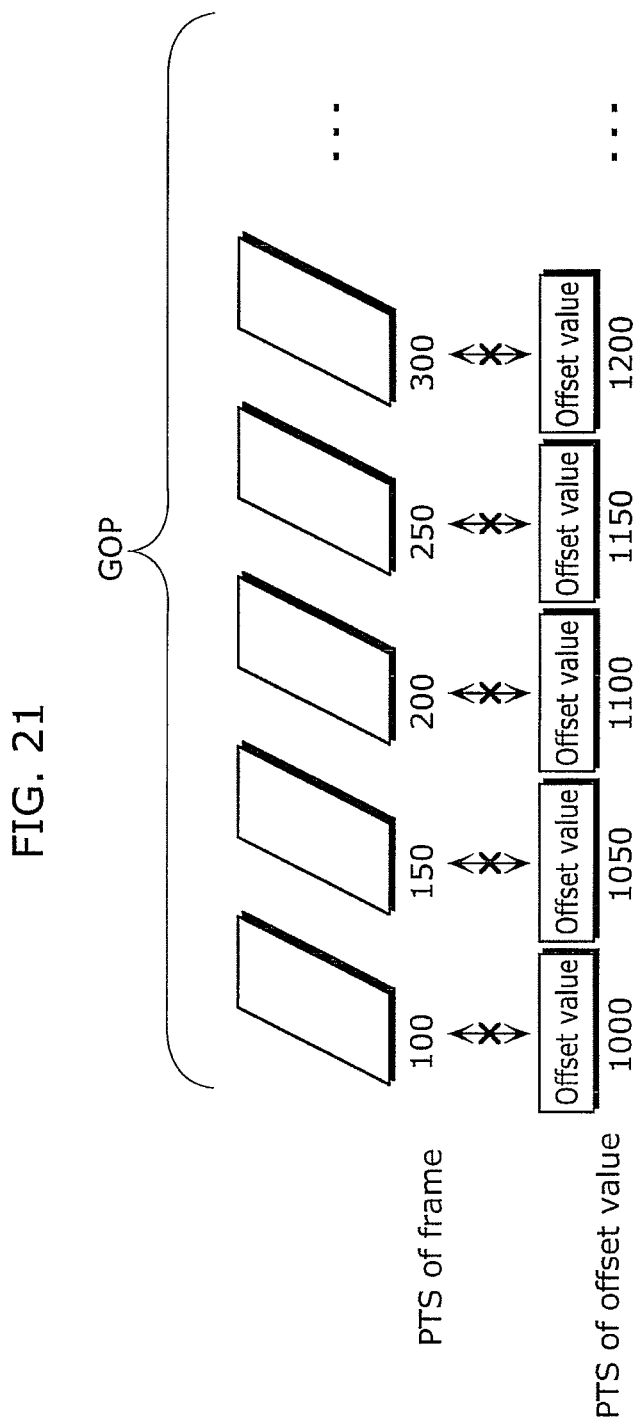
FIG. 21 shows a relation between PTSs of frames and PTSs of offset values in the case where there is an error in PTS, according to the second embodiment of the present invention.

FIG. 20 shows a relation between PTSs of frames and PTSs of offset values 145 in the case where the initial PTS 142 is normal. FIG. 21 shows a relation between PTSs of frames and PTSs of offset values 145 in the case where the initial PTS 142 is inappropriate. Information indicating PTS of each frame (which corresponds to the first time stamp information in the present invention) is included in the input video signals 111. The initial PTS 142 corresponds to the second time stamp information in the present invention.

The offset control unit 105 calculates the PTS of each of the offset values 145 using the initial PTS 142 and the frame rate 141. Furthermore, the offset control unit 105 determines that the frame and the offset value 145 which have the same PTS correspond to each other. In other words, the offset control unit 105 adjusts the display position of each frame in the depth direction by shifting the frame by an amount corresponding to the offset value 145 with the same PTS as the PTS of the frame.

Thus, as shown in FIG. 21, in the case where the value of the initial PTS 142 is inappropriate, there will be no offset value 145 which corresponds to the frame included in the GOP.

Figure 22:
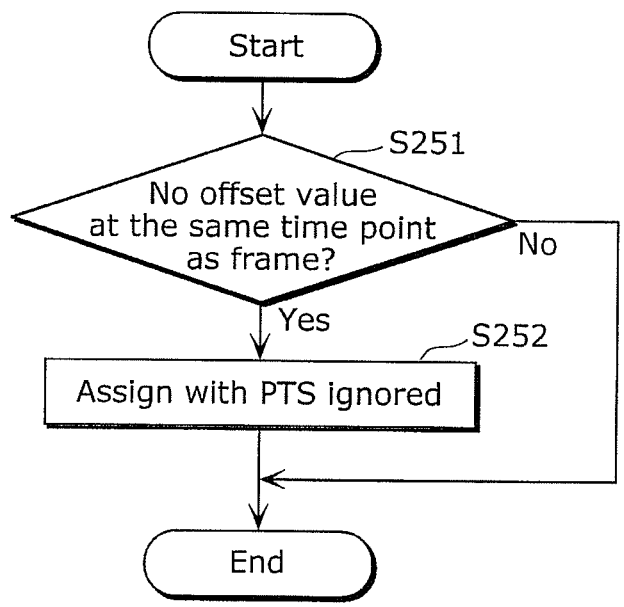
FIG. 22 is a flowchart showing a flow of processing, on the error in PTS, of the 3D video processing apparatus according to the second embodiment of the present invention.

FIG. 22 is a flowchart showing a flow of processing in the error determining unit 207 and the offset value complementing unit 204 in this case.

As shown in FIG. 22, the error determining unit 207 determines whether or not the offset value 145 which has the same PTS as the PTS of the current frame is present in the offset information 112 (S251).

When it is determined in Step S251 that the offset value 145 is not present (Yes in S251), there is an error in the value of the initial PTS 142 and therefore, the offset value complementing unit 204 ignores the PTS of the offset value 145 and assigns the offset value 145 to the corresponding frame (S252).

Specifically, the offset value complementing unit 204 sequentially assigns, in order of frames included in the GOP, the offset values 145 of from ID0 shown in FIG. 7 to the ID with the number indicated by the number of frames 144. In other words, the offset value complementing unit 204 sequentially assigns the offset values 145 in the ascending order of their PTSs, to the frames in the ascending order of their PTSs, among the frames included in the GOP. In addition, the offset control unit 105 adjusts the display position of the picture in the depth direction by shifting each frame by an amount corresponding to the assigned offset value 145.

As the processing in Step S252, it may be possible that the offset value complementing unit 204 complements the initial PTS 142 included in the offset information 112, by assigning the correct value thereto, and the offset control unit 105 then performs the offset control processing using the complemented initial PTS 142, and it may also be possible that, in the case where there is an error, the offset control unit 105 carries out the above-described association between the frames and the offset values 145 and then performs the offset control processing.

Also in the case where the frame rate 141 is not appropriate, there will be no offset values 145 with the same PTS as the PTS of the frames except for the initial frame. In this case, the 3D video processing apparatus 200 may also perform the same processing as above.

Furthermore, when it is determined in Step S251 that the offset value 145 is not present (Yes in S251), the error determining unit 207 may determine that there is an error in the GOP. In this case, it is sufficient that the offset value complementing unit 204 performs the complementing operation in the same manner as above using the offset value 145 of the last frame within the immediately preceding normal GOP and the offset value 145 of the initial frame of the immediately succeeding normal GOP. That is, it is sufficient that, the offset value complementing unit 204 complements the offset value 145 included in the GOP in which an error has occurred, using the offset value 145 extracted by the extracting unit 101, by assigning the offset value which is equal to or greater than the first offset value and is equal to or smaller than the second offset value, where the first offset value represents the smaller one of the offset value 145 of the last frame within the immediately preceding normal GOP and the offset value 145 of the initial frame within the immediately succeeding normal GOP, and the second offset value represents the larger one of the offset value 145 of the last frame within the immediately preceding normal GOP and the offset value 145 of the initial frame within the immediately succeeding normal GOP.

Furthermore, in the case where there is an error in the initial PTS 142, the offset value complementing unit 204 may set a predetermined value (e.g., zero) for the offset value 145 within the GOP.

Furthermore, in the case where there is an error in the initial PTS 142, the offset value complementing unit 204 may refer to the offset information 112 of other GOP than the corresponding GOP to search for the offset value 145 with the same PTS as the PTS of the current frame.

By so doing, the 3D video processing apparatus 200 according to the second embodiment of the present invention is capable of providing a user with favorable 3D video images even in the case where there is an error in the initial PTS 142 or the frame rate 141 included in the offset information 112.

Furthermore, the 3D video processing apparatus 200 may further determine whether or not the number of frames 144 included in the offset information 112 is appropriate, and complement the number of frames 144 when it is not appropriate.

Figure 23:
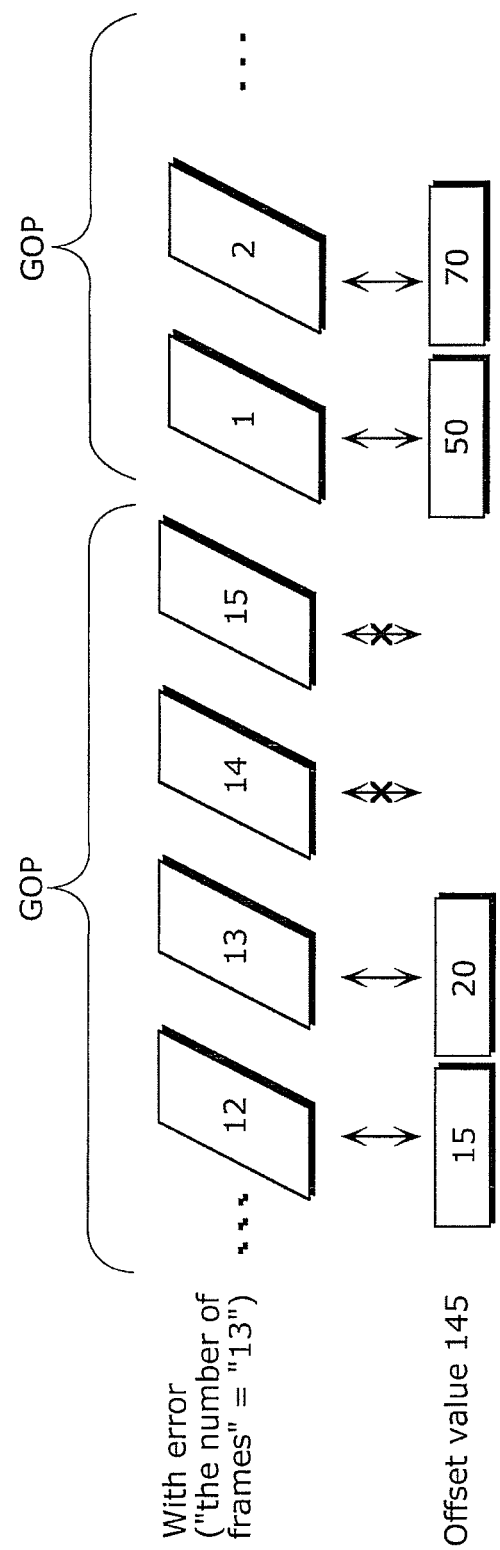
FIG. 23 shows a correspondence relation between frames and offset values in the case where there is an error in the number of frames, according to the second embodiment of the present invention.

FIG. 23 shows a correspondence relation between the frames and the offset values 145 in the case where the number of frames 144 is not appropriate. In the example shown in FIG. 23, the correct value of the number of frames 144 is "15".

As shown in FIG. 23, in the case where the number of frames 144 is "13" by an error, there are no offset values 145 which correspond to the frames "14" and "15".

Figure 24:
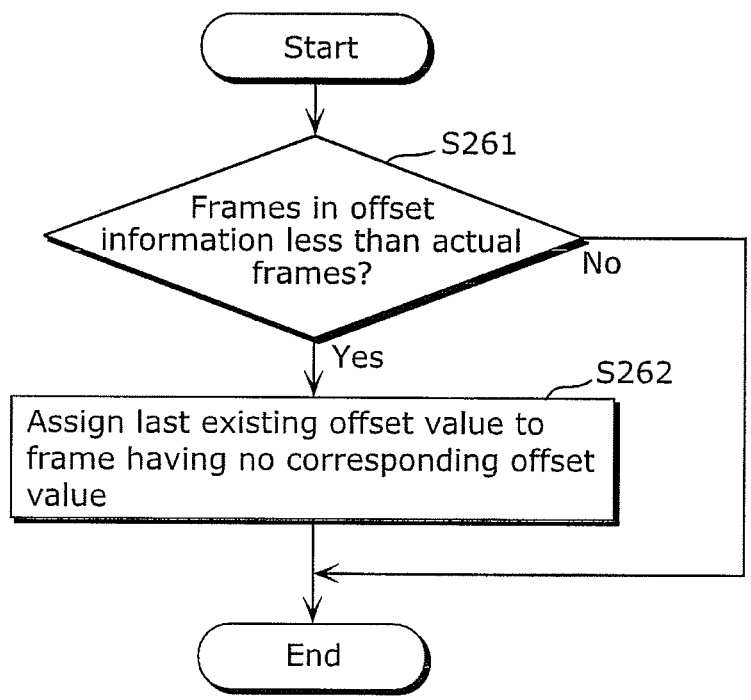
FIG. 24 is a flowchart showing a flow of processing, on the error in the number of frames, of the 3D video processing apparatus according to the second embodiment of the present invention.

FIG. 24 is a flowchart showing a flow of processing in the error determining unit 207 and the offset value complementing unit 204 in this case.

First, the error determining unit 207 determines whether or not the number of frames 144 is appropriate, by determining whether or not the number of frames indicated by the number of frames 144 is smaller than the number of frames actually included in the GOP (S261).

Figure 25:
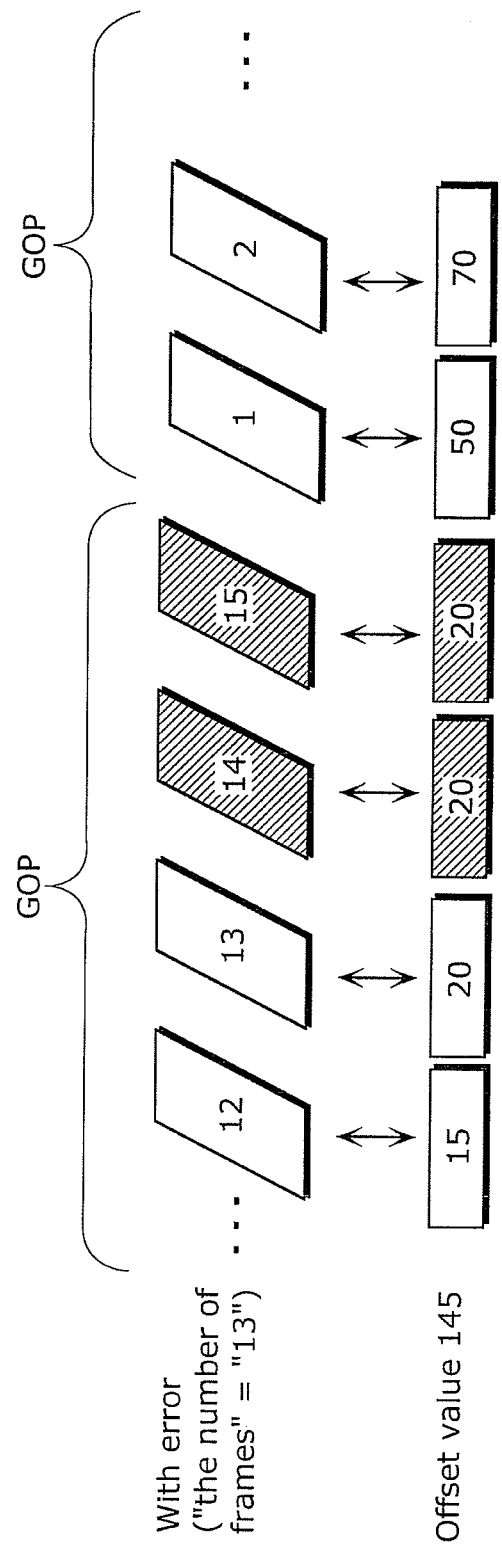
FIG. 25 shows the processing, on the error in the number of frames, of the 3D video processing apparatus according to the second embodiment of the present invention.

When the number of frames indicated by the number of frames 144 is smaller than the number of frames actually included in the GOP (Yes in S261), that is, when the number of frames 144 is inappropriate, the offset value complementing unit 204 complements the offset value 145 of the frame which has no corresponding offset value 145. Specifically, as shown in FIG. 25, the offset value complementing unit 204 sets the value "20" which is the offset value 145 of the frame "13" that is the last frame with the offset value 145, as each of the offset values 145 of the frames "14" and "15" which have no corresponding offset values 145 (S262).

It is to be noted that the offset value complementing unit 204 may calculate the offset value 145 which is used for the complementing operation, using the offset values 145 of the preceding and succeeding frames.

Figure 26:
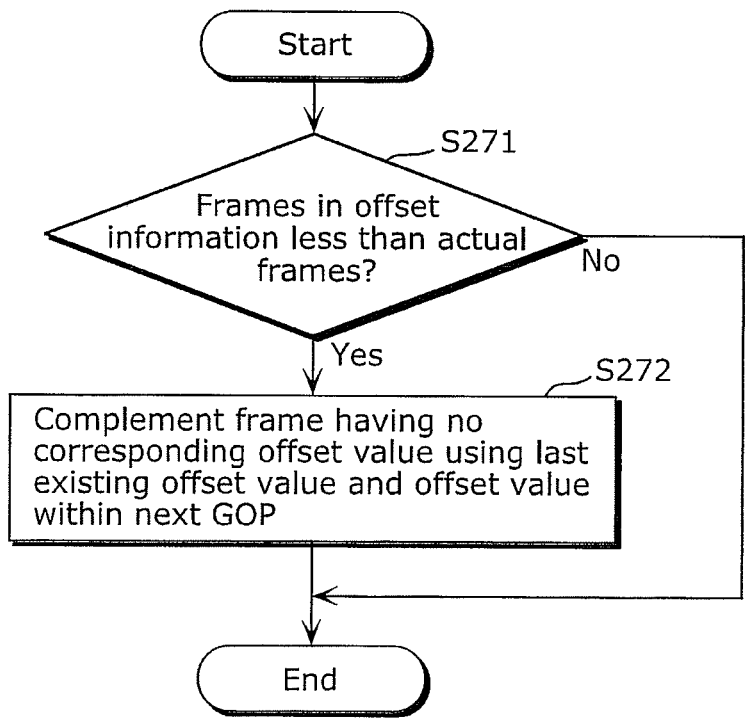
FIG. 26 is a flowchart showing a flow of a variation of the processing, on the error in the number of frames, of the 3D video processing apparatus according to the second embodiment of the present invention.

FIG. 26 is a flowchart showing a flow of processing in the error determining unit 207 and the offset value complementing unit 204 in this case.

First, the error determining unit 207 determines whether or not the number of frames 144 is appropriate, by determining whether or not the number of frames indicated by the number of frames 144 is smaller than the number of frames actually included in the GOP (S271).

Figure 27:
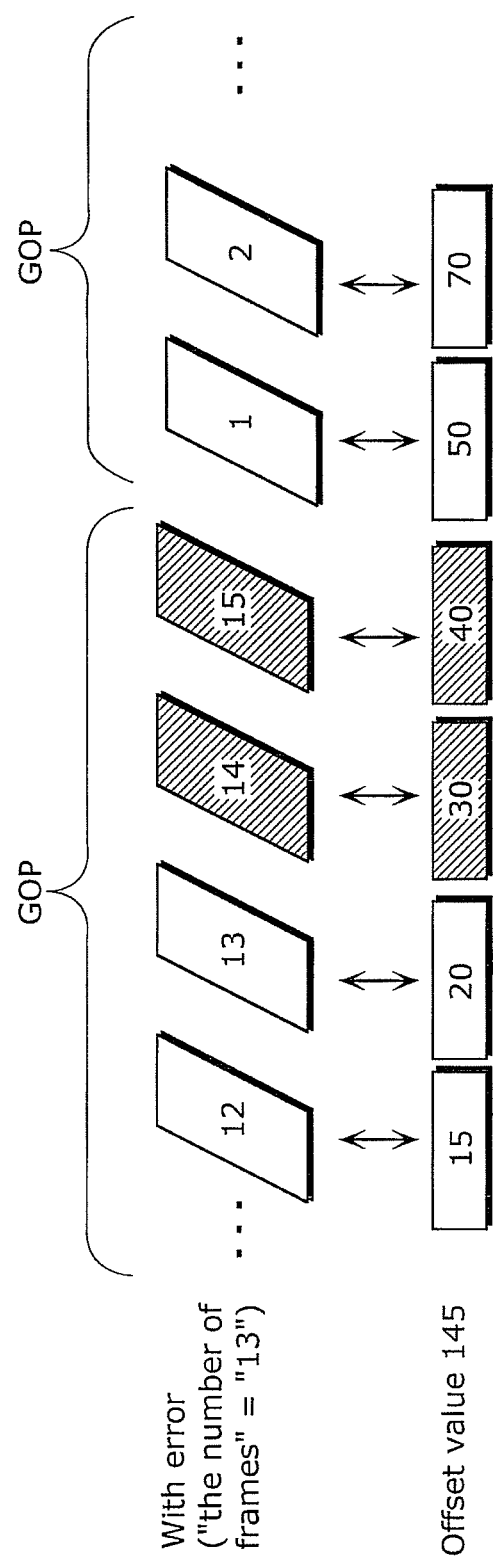
FIG. 27 shows a variation of the processing, on the error in the number of frames, of the 3D video processing apparatus according to the second embodiment of the present invention.

When the number of frames indicated by the number of frames 144 is smaller than the number of frames actually included in the GOP (Yes in S271), that is, when the number of frames 144 is inappropriate, the offset value complementing unit 204 complements the offset value 145 of the frame which has no corresponding offset value 145. Specifically, as shown in FIG. 27, the offset value complementing unit 204 complements the offset values 145 of the frames "14" and "15" which have no corresponding offset values 145, using the offset value 145 of the frame "13" that is the last frame with the offset value 145, and the offset value 145 of the initial frame within the next GOP (S272).

A specific complementing method is the same as the above-described case where there is an error in the offset value 145. That is, it is sufficient that the offset value complementing unit 204 complements, using the offset value 145 extracted by the extracting unit 101, the offset values 145 of all the frames succeeding the frame at the ordinal position indicated by the number of frames 144, among the pictures included in the GOP in which an error has occurred, so that the offset values 145 are equal to or greater than the first offset value and is equal to or smaller than the second offset value, where the first offset value represents the smaller one of the offset value 145 of the frame which is included within the GOP and located at the ordinal position, and the offset value 145 of the initial frame within the immediately succeeding normal GOP, and the second offset value represents the larger one of the offset value 145 of the frame which is included within the GOP and located at the ordinal position, and the offset value 145 of the initial frame within the immediately succeeding normal GOP.

It is to be noted that the offset value complementing unit 204 may complement the offset value 145 of the frame which has no corresponding offset value 145, by assigning a predetermined value (e.g., zero).

Furthermore, the number of frames 144 corresponds to number information in the present invention.

By so doing, the 3D video processing apparatus 200 according to the second embodiment of the present invention is capable of providing a user with favorable 3D video images even in the case where there is an error in the number of frames 144 and the number of offset values 143 included in the offset information 112.

Third Embodiment

In the third embodiment of the present invention, a 3D video processing apparatus 300 which changes the offset value 145 according to user operation is described.

It is to be noted that the 3D video processing apparatus 300 according to the third embodiment of the present invention is applicable to the 3D video display system 10 shown in FIG. 1, as in the case of the above first embodiment.

Figure 28:
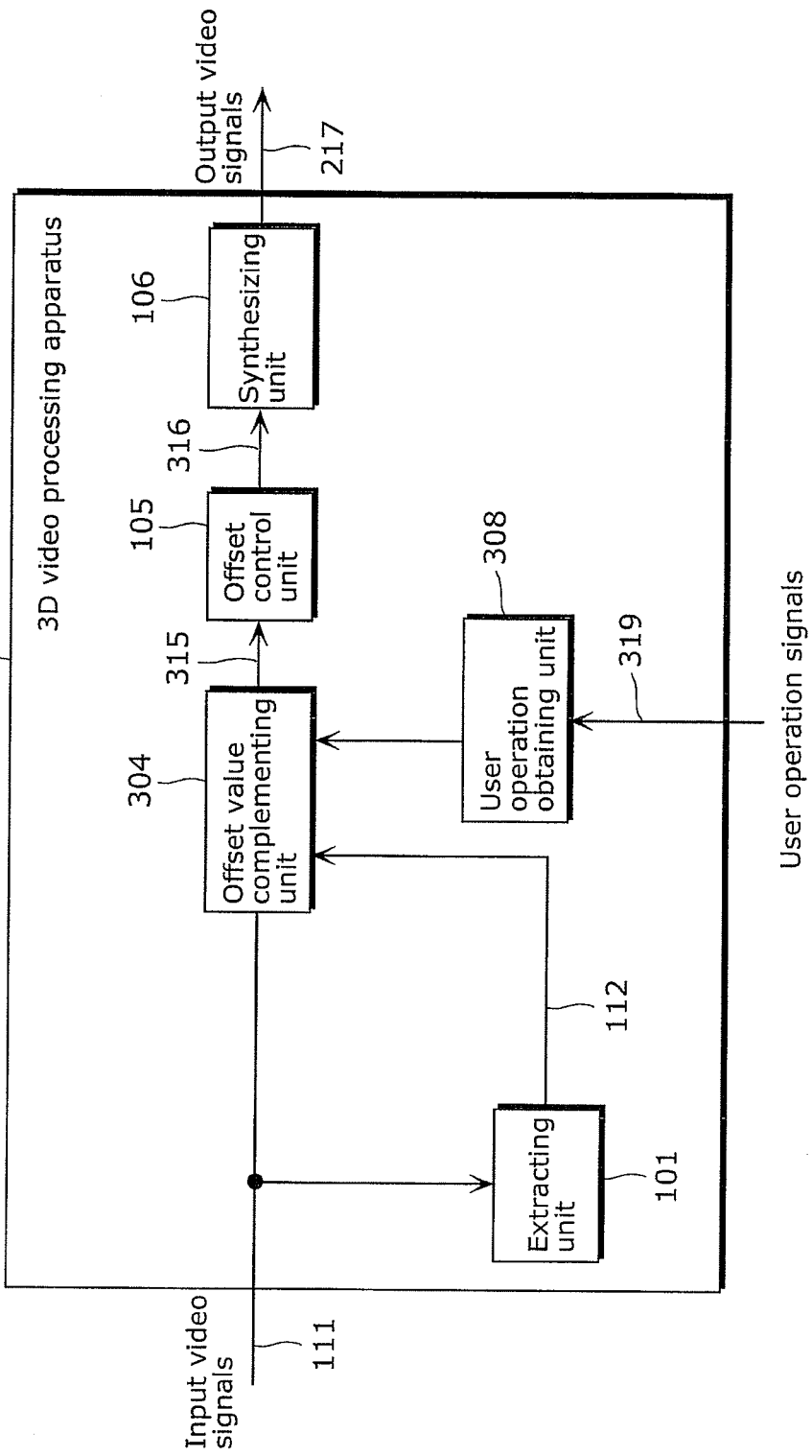
FIG. 28 is a block diagram showing a structure of a 3D video processing apparatus according to the third embodiment of the present invention.

FIG. 28 is a block diagram showing a structure of the 3D video processing apparatus 300 according to the third embodiment of the present invention.

The 3D video processing apparatus 300 shown in FIG. 28 generates output video signals 317 representing a 3D video image which shows a subtitle or a menu image over a primary 3D video image included in the input video signals 111. This 3D video processing apparatus 300 includes the extracting unit 103, an offset value complementing unit 304, the offset control unit 105, the synthesizing unit 106, and a user operation receiving unit 308.

The extracting unit 101 extracts the offset information 112 included in the input video signals 111.

The user operation receiving unit 308 receives user operation signals 319 and outputs them to the offset value complementing unit 304. The user operation signal 319 is a signal indicating a direction and an amount in which the depth-wise display position of the 3D video image is shifted from the present display position based on user operation. The user operation indicates operation of a remote controller or the like by a user, for example.

In the description below, for the purpose of simplifying explanation, the offset value 145 included in the offset information 112 is information indicating a shift amount (the depth-wise display position) of the primary video image and the subtitle.

The offset value complementing unit 304 complements the offset value 145 extracted by the extracting unit 101 (the offset value included in the input video signals 111), according to the user operation signals 319 output by the user operation receiving unit 308. Furthermore, the offset value complementing unit 304 corresponds to an offset value generating unit in the present invention.

Figure 29:
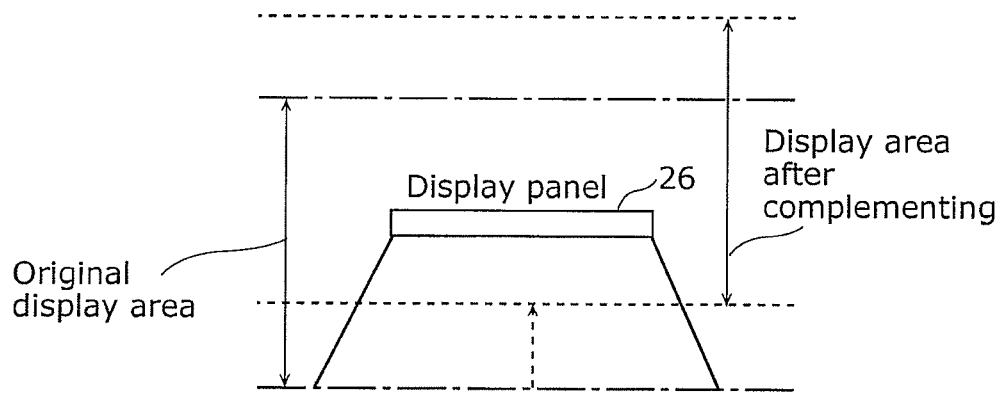
FIG. 29 shows processing of an offset value complementing unit according to the third embodiment of the present invention.

FIG. 29 shows the processing of the offset value complementing unit 304.

For example, as shown in FIG. 29, the offset value complementing unit 304 generates a complementary video signal 315 by changing the offset value 145 so as to shift the depth-wise display areas of the primary video image and the subtitle.

Figure 30:
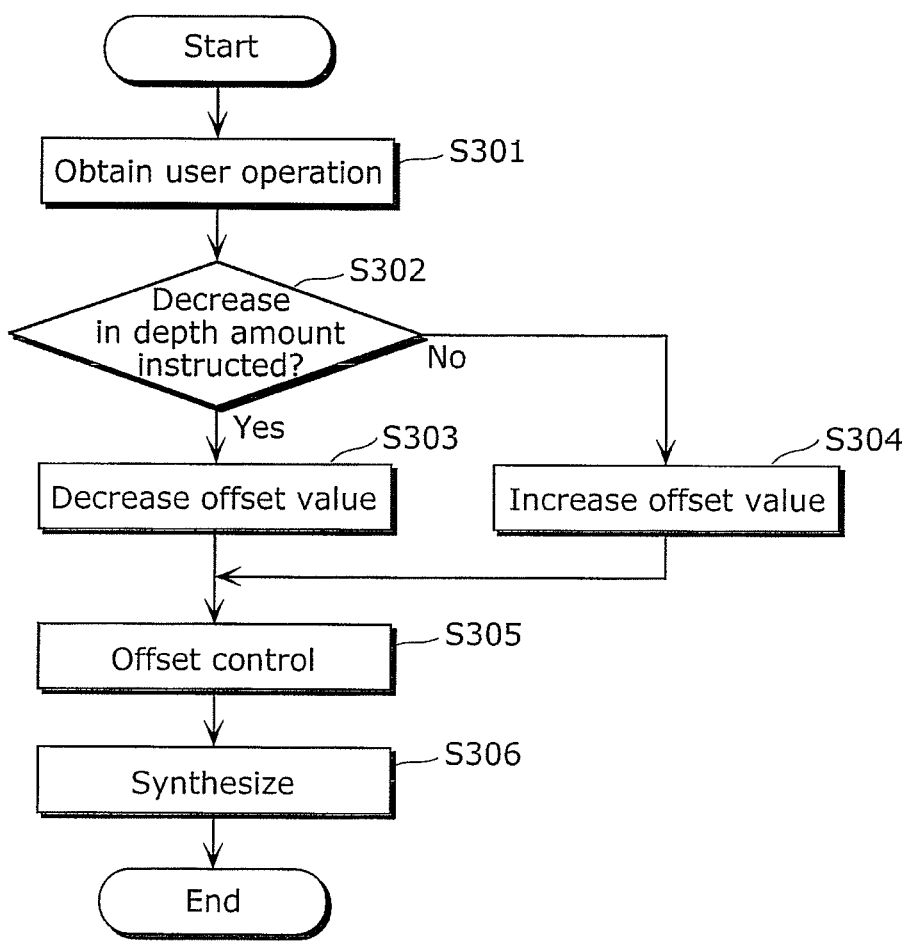
FIG. 30 is a flowchart showing a processing flow of the 3D video processing apparatus according to the third embodiment of the present invention.

FIG. 30 is a flowchart showing the processing flow of the 3D video processing apparatus 300. The 3D video processing apparatus 300 executes the processing shown in FIG. 30, on a per GOP basis, for example.

First, the user operation receiving unit 308 receives the user operation signals 319 (S301).

Next, according to the user operation signals 319, the offset value complementing unit 304 complements the offset value 145 extracted by the extracting unit 101.

Specifically, when a user feels that the depth amount of the 3D video image is too much and thus performs an operation to decrease the depth amount, the user operation signals 319 indicate that the depth-wise display position of the 3D video image is to be shifted backward from the present display position (Yes in S302). In this case, the offset value complementing unit 304 generates the complementary video signal 315 by decreasing the offset vale 145 extracted by the extracting unit 101 (S303).

On the other hand, when a user feels that the depth amount of the 3D video image is small and thus performs an operation to increase the depth amount, the user operation signals 319 indicate that the depth-wise display position of the 3D video image is to be shifted forward from the present display position (No in S302). In this case, the offset value complementing unit 304 generates the complementary video signal 315 by increasing the offset vale 145 extracted by the extracting unit 101 (S304).

Next, the offset control unit 105 generates an adjusted video signal 316 by shifting the primary video image or the subtitle by an amount corresponding to a value indicated by the offset value 145 generated in Step S303 or S304 by the offset value complementing unit 304 (S305).

Next, the synthesizing unit 106 generates the output video signal 217 displayed by superimposition of the primary video image and the subtitle included in the adjusted video signal 316 (S306).

The 3D video processing apparatus 300 may first perform the synthesis (S306) and then perform the offset control (S305).

By so doing, the 3D video processing apparatus 300 according to the third embodiment of the present invention is capable of changing the depth amount of the 3D video image according to user operation. This allows the 3D video processing apparatus 300 according to the third embodiment of the present invention to produce better 3D video images for users.

Figure 31:
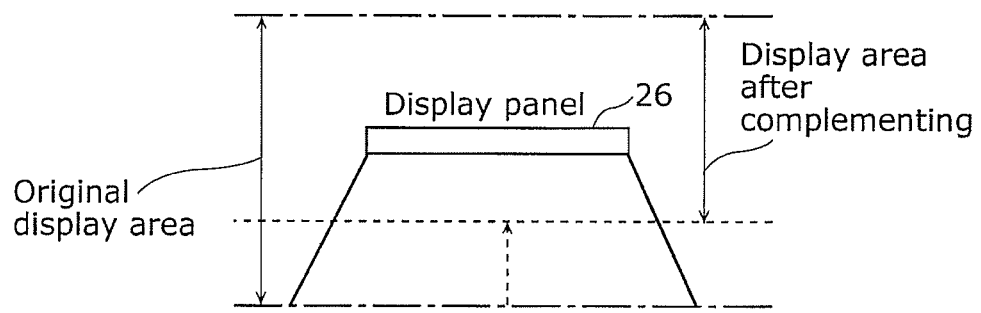
FIG. 31 shows a variation of the processing of the offset value complementing unit according to the third embodiment of the present invention.

In the example shown in FIG. 29, the display areas before and after the complementing operation have substantially the same widths, but they may have different widths. In addition, as shown in FIG. 31, the offset value complementing unit 304 may complement the offset value 145 so that only a front part of the display area is shifted.

Figure 32:
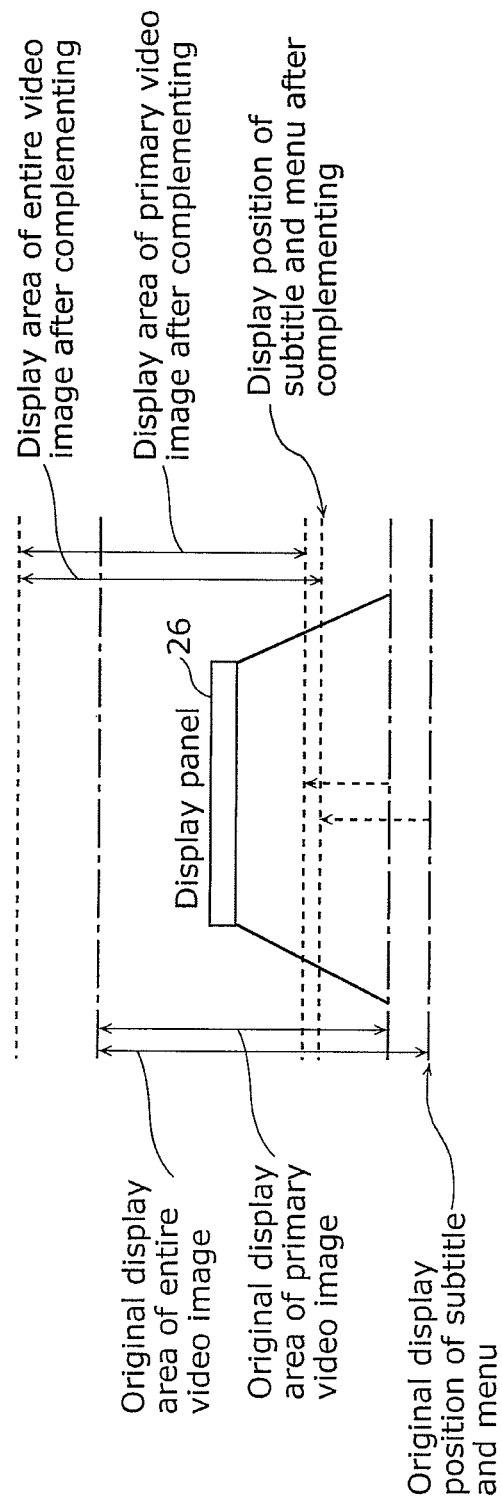
FIG. 32 shows a variation of the processing of the offset value complementing unit according to the third embodiment of the present invention.

Furthermore, as a method of changing (increasing or decreasing) the width of the display area, it is possible to set different values for the shift amount of the display position of the video image (e.g., the subtitle) that is to be displayed in front and for the shift amount of the display position of the video image (e.g., the primary video image) that is to be displayed behind, to thereby change the width of the display area. For example, as shown in FIG. 32, the width of the display area of the whole video including the primary video image and the subtitle can be smaller by setting the shift amount of the display position of the subtitle or the like that is to be displayed in front, to be larger than the shift amount of the display position of the primary video image that is to be displayed behind.

Furthermore, in the case where the 3D video signals include information indicating the depth-wise position of each object included in the 3D video signals, the 3D video processing apparatus 300 may change the width of the display area by determining, using such information, the shift amount for each object.

Furthermore, the 3D video processing apparatus 300 may change the width of the display area by first calculating a parallax (the depth-wise position) of each object from the left-eye video image and the right-eye video image of the 3D video, and then determining, using such a parallax, the shift amount for each object.

It is to be noted that the display area of the 3D video is variable according to a size of the display panel 26 and a viewing position of a user and thus not uniquely determined by the video signals only. This means that each of the display areas shown in FIGS. 29, 31, and 32 schematically indicates a displacement (parallax) between the left-eye video image and the right-eye video image included in the 3D video. In addition, the backside boundary of the display area may be defined as infinity.

Furthermore, although the above description illustrates an example where the 3D video processing apparatus 300 complements the offset value 145 included in the input video signals 111, the input video signals 111 may not include the offset information 112. In this case, it is sufficient that the offset value complementing unit 304 generates new offset information 112.

While the above describes the 3D video processing apparatuses 100, 200, and 300 according to the first to third embodiments of the present invention, the present invention is not limited to these embodiments.

For example, the above description illustrates an example where a pair of dedicated glasses (the shutter glasses 43) is used, but the present invention is applicable also to a system which uses no dedicated glasses.

Furthermore, while the above description illustrates an example where the 3D video includes two video images (the left-eye video image and the right-eye video image) which have a parallax therebetween, the 3D video may include three or more video images which have a parallax therebetween.

Furthermore, while the above description illustrates an example where each of the 3D video processing apparatuses 100, 200, and 300 according to the implementations of the present invention is applied to a digital television and a digital video recorder, the 3D video processing apparatuses 100, 200, and 300 according to the implementations of the present invention are applicable to 3D video display devices (such as mobile phone devices and personal computers) other than the digital television, which display 3D video. Furthermore, the 3D video processing apparatuses 100, 200, and 300 according to the implementations of the present invention are applicable to 3D video output devices (such as BD players) other than the digital video recorder, which output 3D video.

Furthermore, each of the above 3D video processing apparatuses 100, 200, and 300 according to the first to third embodiments is typically implemented as a large-scale integration (LSI) that is an integrated circuit. Components may be each formed into a single chip, and it is also possible to integrate part or all of the components in a single chip.

This circuit integration is not limited to the LSI and may be achieved by providing a dedicated circuit or using a general-purpose processor. It is also possible to utilize a field programmable gate array (FPGA), with which LSI is programmable after manufacture, or a reconfigurable processor, with which connections, settings, etc., of circuit cells in LSI are reconfigurable.

Furthermore, if any other circuit integration technology to replace LSI emerges thanks to semiconductor technology development or other derivative technology, such technology may, of course, be used to integrate the processing units.

Moreover, the processor such as CPU may execute a program to perform part or all of the functions of the 3D video processing apparatuses 100, 200, and 300 according to the first to third embodiments of the present invention.

Furthermore, the present invention may be the above program or a recording medium on which the above program has been recorded. It goes without saying that the above program may be distributed via a communication network such as the Internet.

Furthermore, the present invention may be implemented as a 3D video processing method which includes, as steps, characteristic means included in the 3D video processing apparatus. The present invention may also be implemented as a 3D video display apparatus, such as a digital television, which includes the above-described 3D video processing apparatus, and implemented as a 3D video display system which includes the 3D video display apparatus.

Furthermore, it may also be possible to combine at least part of functions of the above-described 3D video processing apparatuses 100, 200, and 300 according to the first to third embodiments and variations thereof.

All the numbers herein are given as examples to provide specific explanations of the present invention, and the present invention is thus not restricted by those numbers.

Furthermore, the structures of the above-described 3D video processing apparatuses 100, 200, and 300 are given as examples to provide specific explanations of the present invention, and thus, the 3D video processing apparatus according to an implementation of the present invention does not necessarily require all the above structures. In other words, it is sufficient that the 3D video processing apparatus according to an implementation of the present invention includes only the minimum structure that can provide an effect of the present invention.

Likewise, the above-described 3D video processing methods executed by the 3D video processing apparatuses are given as examples to provide specific explanations of the present invention, and thus, the 3D video processing method executed by the 3D video processing apparatus, according to an implementation of the present invention, does not necessarily require all the above steps. In other words, it is sufficient that the 3D video processing method according to an implementation of the present invention includes only the minimum steps that can provide an effect of the present invention. In addition, the execution order of the above steps is given as an example to provide specific explanations of the present invention and therefore may be other order than that illustrated above. A part of the above step may be carried out at the same time as (in parallel with) another step.

Furthermore, the present invention encompasses various embodiments that are obtained by making various modifications which those skilled in the art could think of, to the present embodiments, without departing from the spirit or scope of the present invention.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is applicable to 3D video processing apparatuses and particularly to digital televisions, digital video recorders, and the like.

What is claimed is:
1. A three-dimensional (3D) video processing apparatus that processes a video signal which includes video data indicating a 3D video and control information on the video data, said 3D video processing apparatus comprising:
    an extracting unit configured to extract, from the control information, an offset value that is assigned to each of pictures included in the video data and indicates an amount by which at least part of the picture is shifted to adjust a depth-wise display position of the part;

an offset value complementing unit configured to complement the offset value of a first picture using the offset value extracted by said extracting unit, by assigning, to the first picture, the offset value which is equal to or greater than a first offset value and equal to or smaller than a second offset value, the first offset value representing a smaller one of the offset value assigned to a second picture temporally preceding the first picture and the offset value assigned to a third picture temporally succeeding the first picture, and the second offset value representing a larger one of the offset value assigned to the second picture and the offset value assigned to the third picture;

an offset control unit configured to adjust the depth-wise display position of at least part of the first picture by shifting the part by an amount corresponding to the offset value complemented by said offset value complementing unit; and an error determining unit configured to determine whether or not the offset value assigned to each of the pictures included in the video data is appropriate;

wherein the first picture is a picture which has the offset value determined as not appropriate by said error determining unit, the second picture is a picture which has the offset value determined as appropriate by said error determining unit and immediately precedes the first picture, the third picture is a picture which has the offset value determined as appropriate by said error determining unit and immediately succeeds the first picture, and wherein said error determining unit is configured to determine that the offset value of a current picture is not appropriate, when at least one of the following differences is equal to or greater than a predetermined threshold: a difference between the offset value of the current picture and the offset value of a picture immediately preceding the current picture; and a difference between the offset value of the current picture and the offset value of a picture immediately succeeding the current picture.

2. A three-dimensional (3D) video processing apparatus that processes a video signal which includes video data indicating a 3D video and control information on the video data, said 3D video processing apparatus comprising:

an extracting unit configured to extract, from the control information, an offset value that is assigned to each of pictures included in the video data and indicates an amount by which at least part of the picture is shifted to adjust a depth-wise display position of the part;

an offset value complementing unit configured to complement the offset value of a first picture using the offset value extracted by said extracting unit, by assigning, to the first picture, the offset value which is equal to or greater than a first offset value and equal to or smaller than a second offset value, the first offset value representing a smaller one of the offset value assigned to a second picture temporally preceding the first picture and the offset value assigned to a third picture temporally succeeding the first picture, and the second offset value representing a larger one of the offset value assigned to the second picture and the offset value assigned to the third picture;

an offset control unit configured to adjust the depth-wise display position of at least part of the first picture by shifting the part by an amount corresponding to the offset value complemented by said offset value complementing unit; and an error determining unit configured to determine whether or not the offset value assigned to each of the pictures included in the video data is appropriate;

wherein the first picture is a picture which has the offset value determined as not appropriate by said error determining unit, the second picture is a picture which has the offset value determined as appropriate by said error determining unit and immediately precedes the first picture, the third picture is a picture which has the offset value determined as appropriate by said error determining unit and immediately succeeds the first picture, the control information includes first time stamp information indicating a first presentation time point of each of the pictures, and offset information assigned to each unit of the pictures, the offset information includes a plurality of offset values each of which is the offset value assigned to a corresponding one of the pictures, and second time stamp information indicating a second presentation time point corresponding to each of the offset values, said offset control unit is configured to adjust the depth-wise display position of at least part of each of the pictures by shifting the part by an amount corresponding to the offset value corresponding to the second presentation time point which is the same as the first presentation time point of the picture, said error determining unit is further configured to determine that the second time stamp information for each unit of the pictures is inappropriate, when the offset information does not include the offset value corresponding to the second presentation time point which is the same as the first presentation time point of the pictures included in the unit of the pictures, and said offset control unit is configured to adjust the depth-wise display position of each of the pictures by (i) sequentially assigning offset values in an ascending order of presentation time points indicated by the second time stamp information, to pictures in an ascending order of presentation time points indicated by the first time stamp information, among the pictures included in the unit of the pictures for which the second time stamp information is determined as inappropriate by said error determining unit, and (ii) shifting at least part of the picture by an amount corresponding to a corresponding one of the assigned offset values.

3. A three-dimensional (3D) video processing apparatus that processes a video signal which includes video data indicating a 3D video and control information on the video data, said 3D video processing apparatus comprising:

an extracting unit configured to extract, from the control information, an offset value that is assigned to each of pictures included in the video data and indicates an amount by which at least part of the picture is shifted to adjust a depth-wise display position of the part;

an offset value complementing unit configured to complement the offset value of a first picture using the offset value extracted by said extracting unit, by assigning, to the first picture, the offset value which is equal to or greater than a first offset value and equal to or smaller than a second offset value, the first offset value representing a smaller one of the offset value assigned to a second picture temporally preceding the first picture and the offset value assigned to a third picture temporally succeeding the first picture, and the second offset value representing a larger one of the offset value assigned to the second picture and the offset value assigned to the third picture;

an offset control unit configured to adjust the depth-wise display position of at least part of the first picture by shifting the part by an amount corresponding to the offset value complemented by said offset value complementing unit; and an error determining unit configured to determine whether or not the offset value assigned to each of the pictures included in the video data is appropriate;

wherein the first picture is a picture which has the offset value determined as not appropriate by said error determining unit, the second picture is a picture which has the offset value determined as appropriate by said error determining unit and immediately precedes the first picture, the third picture is a picture which has the offset value determined as appropriate by said error determining unit and immediately succeeds the first picture, the control information includes first time stamp information indicating a first presentation time point of each of the pictures, and offset information assigned to each unit of the pictures, the offset information includes a plurality of offset values each of which is the offset value assigned to a corresponding one of the pictures, and second time stamp information indicating a second presentation time point corresponding to each of the offset values, said offset control unit is configured to adjust the depth-wise display position of at east part of each of the pictures by shifting the part by an amount corresponding to the offset value corresponding to the second presentation time point which is the same as the first presentation time point of the picture, said error determining unit is further configured to determine that the second time stamp information for each unit of the pictures is inappropriate, when the offset information does not include the offset value corresponding to the second presentation time point which is the same as the first presentation time point of the pictures included in the unit of the pictures, and said offset value complementing unit configured to complement the offset value included in the offset information which is assigned to the unit of the pictures for which the second time stamp information is determined as inappropriate by said error determining unit, by assigning a predetermined value as the offset value.

4. A three-dimensional (3D) video processing apparatus that processes a video signal which includes video data indicating a 3D video and control information on the video data, said 3D video processing apparatus comprising:

an extracting unit configured to extract, from the control information, an offset value that is assigned to each of pictures included in the video data and indicates an amount by which at least part of the picture is shifted to adjust a depth-wise display position of the part;

an offset value complementing unit configured to complement the offset value of a first picture using the offset value extracted by said extracting unit, by assigning, to the first picture, the offset value which is equal to or greater than a first offset value and equal to or smaller than a second offset value, the first offset value representing a smaller one of the offset value assigned to a second picture temporally preceding the first picture and the offset value assigned to a third picture temporally succeeding the first picture, and the second offset value representing a larger one of the offset value assigned to the second picture and the offset value assigned to the third picture; and an offset control unit configured to adjust the depth-wise display position of at least part of the first picture by shifting the part by an amount corresponding to the offset value complemented by said offset value complementing unit, wherein the control information includes first time stamp information indicating a first presentation time point of each of the pictures, and offset information assigned to each unit of the pictures, the offset information includes a plurality of offset values each of which is the offset value assigned to a corresponding one of the pictures, and second time stamp information indicating a second presentation time point corresponding to each of the offset values, said offset control unit is configured to adjust the depth-wise display position of at least part of each of the pictures by shifting the part by an amount corresponding to the offset value corresponding to the second presentation time point which is the same as the first presentation time point of the picture, said 3D video processing apparatus further comprises an error determining unit configured to determine that the second time stamp information for each unit of the pictures is inappropriate, when the offset information does not include the offset value corresponding to the second presentation time point which is the same as the first presentation time point of the pictures included in the unit of the pictures, all pictures included in the unit of the pictures for which the second time stamp information is determined as inappropriate by said error determining unit are the first picture, a last picture included in the unit of the pictures is the second picture, the unit immediately preceding the unit of the pictures for which the second time stamp information is determined as inappropriate by said error determining unit, and an initial picture included in the unit of the pictures is the third picture, the unit immediately succeeding the unit of the pictures for which the second time stamp information is determined as inappropriate by said error determining unit.

5. A three-dimensional (3D) video processing apparatus that processes a video signal which includes video data indicating a 3D video and control information on the video data, said 3D video processing apparatus comprising:

an extracting unit configured to extract, from the control information, an offset value that is assigned to each of pictures included in the video data and indicates an amount by which at least part of the picture is shifted to adjust a depth-wise display position of the part;

an offset value complementing unit configured to complement the offset value of a first picture using the offset value extracted by said extracting unit, by assigning, to the first picture, the offset value which is equal to or greater than a first offset value and equal to or smaller than a second offset value, the first offset value representing a smaller one of the offset value assigned to a second picture temporally preceding the first picture and the offset value assigned to a third picture temporally succeeding the first picture, and the second offset value representing a larger one of the offset value assigned to the second picture and the offset value assigned to the third picture; and an offset control unit configured to adjust the depth-wise display position of at least part of the first picture by shifting the part by an amount corresponding to the offset value complemented by said offset value complementing unit, wherein the control information includes offset information assigned to each of video data in a unit of the pictures, the offset information includes the offset value assigned to a corresponding one of the pictures, and number information indicating the number of offset values included in the offset information, said 3D video processing apparatus further comprises an error determining unit configured to determine that the number information is inappropriate, when the number of offset values indicated by the number information is smaller than the number of pictures included in a corresponding unit of the pictures, all pictures succeeding a picture at an ordinal position indicated by the number information are the first picture, the all pictures being included in the unit of the pictures for which the number information is determined as inappropriate by said error determining unit, the picture located at the ordinal position indicated by the number information is the second picture, the picture being included in the unit of the pictures for which the number information is determined as inappropriate by said error determining unit, and an initial picture included in the unit of the pictures is the third picture, the unit immediately succeeding the unit of the pictures for which the number information is determined as inappropriate by said error determining unit.

6. A three-dimensional (3D) video processing apparatus that processes a video signal which includes video data indicating a 3D video and control information on the video data, said 3D video processing apparatus comprising:

an extracting unit configured to extract, from the control information, an offset value that is assigned to each of pictures included in the video data and indicates an amount by which at least part of the picture is shifted to adjust a depth-wise display position of the part;

an offset value complementing unit configured to complement the offset value of a first picture using the offset value extracted by said extracting unit, by assigning, to the first picture, the offset value which is equal to or greater than a first offset value and equal to or smaller than a second offset value, the first offset value representing a smaller one of the offset value assigned to a second picture temporally preceding the first picture and the offset value assigned to a third picture temporally succeeding the first picture, and the second offset value representing a larger one of the offset value assigned to the second picture and the offset value assigned to the third picture; and an offset control unit configured to adjust the depth-wise display position of at least part of the first picture by shifting the part by an amount corresponding to the offset value complemented by said offset value complementing unit, wherein the video data includes first video data indicating a first 3D video, and second video data indicating a second 3D video, said offset control unit is configured to (i) adjust a depth-wise display position of an image of the second 3D video included in the first picture, by shifting the image by the amount corresponding to the offset value complemented by said offset value complementing unit, and (ii) generate second adjusted video data resulting from the adjustment, said 3D video processing apparatus further comprises a synthesizing unit configured to synthesize the first video data and the second adjusted video data, and the first 3D video indicated by the first video data includes a first left-eye image and a first right-eye image, and the second 3D video indicated by the second video data includes a second left-eye image and a second right-eye image.

7. The 3D video processing apparatus according to claim 6, wherein the second 3D video is a subtitle or a menu display image.

* * * * *